(12) United States Patent
Coleman

(10) Patent No.: US 7,684,483 B2
(45) Date of Patent: Mar. 23, 2010

(54) METHOD AND APPARATUS FOR DIGITIZING AND COMPRESSING REMOTE VIDEO SIGNALS

(75) Inventor: Scott Coleman, Fairfax, VA (US)

(73) Assignee: Raritan Americas, Inc., Somerset, NJ (US)

( * ) Notice: Subject to any disclaimer, the term of this patent is extended or adjusted under 35 U.S.C. 154(b) by 846 days.

(21) Appl. No.: 10/233,299

(22) Filed: Aug. 29, 2002

(65) Prior Publication Data

US 2004/0042547 A1  Mar. 4, 2004

(51) Int. Cl.
H04N 7/18 (2006.01)
(52) U.S. Cl. .............................. 375/240.01; 375/240.26
(58) Field of Classification Search ......... 348/142–160; 709/202–220; 358/420–539; 382/160–170; 375/240.01–240.29
See application file for complete search history.

(56) References Cited

U.S. PATENT DOCUMENTS

| | | | |
|---|---|---|---|
| 4,698,672 A | 10/1987 | Chen et al. | |
| 4,771,865 A | 9/1988 | Hinderling | |
| 5,008,747 A | 4/1991 | Carr et al. | |
| 5,483,634 A | 1/1996 | Hasegawa | |
| 5,552,832 A | 9/1996 | Astle | |
| 5,576,845 A | 11/1996 | Komatsu | |
| 5,721,842 A | 2/1998 | Beasley et al. | |
| 5,732,212 A | 3/1998 | Perholtz et al. | |
| 5,742,274 A | 4/1998 | Henry et al. | |
| 5,757,424 A | 5/1998 | Frederick | |
| 5,767,897 A | 6/1998 | Howell | |
| 5,802,213 A | 9/1998 | Gardos | |
| 5,821,986 A | 10/1998 | Yuan et al. | |
| 5,861,960 A * | 1/1999 | Suzuki et al. ................ 382/239 |
| 5,884,096 A | 3/1999 | Beasley et al. | |
| 5,937,176 A | 8/1999 | Beasley et al. | |
| 6,016,166 A | 1/2000 | Huang et al. | |
| 6,091,857 A | 7/2000 | Shaw et al. | |
| 6,112,264 A | 8/2000 | Beasley et al. | |
| 6,167,432 A | 12/2000 | Jiang | |
| 6,173,082 B1 | 1/2001 | Ishida et al. | |
| 6,263,365 B1 | 7/2001 | Scherpbier | |
| 6,289,378 B1 | 9/2001 | Meyer et al. | |
| 6,304,895 B1 * | 10/2001 | Schneider et al. ........... 709/203 |
| 6,330,595 B1 | 12/2001 | Ullman et al. | |
| 6,333,750 B1 | 12/2001 | Odryna et al. | |
| 6,343,313 B1 | 1/2002 | Salesky et al. | |
| 6,345,323 B1 | 2/2002 | Beasley et al. | |
| 6,363,062 B1 | 3/2002 | Aaronson | |
| 6,373,850 B1 | 4/2002 | Lecourtier et al. | |

(Continued)

OTHER PUBLICATIONS

International Search Report for Application No. PCT/US05/25275, dated May 11, 2006.

(Continued)

*Primary Examiner*—Andy S Rao

(57) ABSTRACT

A method and apparatus for digitizing and compressing video signals for transmitting the signals between a remotely located computer and a host or local computer. The digitization and compression method and apparatus is capable of dividing frame buffers into cells and comparing image data from previously captured frame buffers to create synchronized video signals and transmit the video signals over an extended range by limiting the portions of the transmission bandwidth of pixel data transferred between the remote computer and the local computer. In an alternate embodiment of the present invention, a keyboard video mouse switch is disposed between the remotely located computer and the local computer.

15 Claims, 17 Drawing Sheets

U.S. PATENT DOCUMENTS

| | | | |
|---|---|---|---|
| 6,388,658 B1* | 5/2002 | Ahern et al. | 345/168 |
| 6,408,334 B1 | 6/2002 | Bassman et al. | |
| 6,445,818 B1* | 9/2002 | Kim et al. | 382/165 |
| 6,532,218 B1 | 3/2003 | Shaffer et al. | |
| 6,535,983 B1 | 3/2003 | McCormack | |
| 6,539,418 B2 | 3/2003 | Schneider et al. | |
| 6,567,813 B1 | 5/2003 | Zhu et al. | |
| 6,567,869 B2 | 5/2003 | Shirley | |
| 6,571,016 B1 | 5/2003 | Mehrotra et al. | |
| 6,621,413 B1 | 9/2003 | Roman et al. | |
| 6,622,018 B1 | 9/2003 | Erekson | |
| 6,664,969 B1 | 12/2003 | Emerson | |
| 6,675,174 B1 | 1/2004 | Bolle | |
| 6,728,753 B1 | 4/2004 | Parasnis et al. | |
| 6,771,213 B2 | 8/2004 | Durst | |
| 6,772,169 B2 | 8/2004 | Kaplan | |
| 6,850,502 B1 | 2/2005 | Kagan | |
| 6,952,495 B1* | 10/2005 | Lee et al. | 382/168 |
| 7,024,474 B2 | 4/2006 | Clubb | |
| 7,042,587 B2 | 5/2006 | Fiske | |
| 7,099,934 B1 | 8/2006 | Ewing et al. | |
| 7,117,266 B2 | 10/2006 | Fishman et al. | |
| 7,249,167 B1 | 7/2007 | Liaw | |
| 2002/0038334 A1 | 3/2002 | Schneider | |
| 2002/0095594 A1 | 7/2002 | Dellmo | |
| 2002/0147840 A1 | 10/2002 | Mutton | |
| 2003/0017826 A1 | 1/2003 | Fishman | |
| 2003/0030660 A1 | 2/2003 | Dischert | |
| 2003/0037130 A1 | 2/2003 | Rollins | |
| 2003/0088655 A1 | 5/2003 | Leigh | |
| 2003/0092437 A1 | 5/2003 | Nowlin | |
| 2003/0112467 A1 | 6/2003 | McCollum | |

OTHER PUBLICATIONS

Yueh-Feng, A Configurable Java Architecture for Mobile Terminal Software Download, Wireless Communications Conference, WCNC2002 IEEE, 17-21 03/02, vol. 1, pp. 144-149.
International Search Report and Written Opinion for PCT/US04/29899 dated Aug. 31, 2006.
The International Search Report and Written Opinion for PCT/US05/40948 dated Jul. 20, 2006.
The International Search Report and Written Opinion for PCT/US05/07684 dated Sep. 25, 2007.
The International Search Report and Written Opinion for PCT/US06/12280 dated Mar. 14, 2007.
Adder, Products Brochure, APX 304572-304579, Apr. 1, 1998, 8 pages.
AdderViewOSD, Products Brochure, RCI 173246-173279, Aug. 1, 2002.
Avocent's Pre-Markman Hearing Memorandum in Support of its Proposed Claim Constructions (Dec. 15, 2004).
Avocent Redmond's Answering Pre-Markman Hearing Briefing (Jan. 18, 2005).
Avocent Redmond's Supplemental Responses to Raritan's Second Set of Post-Remand Interrogatories (Nos. 15R-17R), Mar. 14, 2005.
Apex, OutLook User Guide, 1997.
Apex et al., Products Brochure, APX 082949-082971, 1996.
Apex Pc Solutions, Users Guide, 1993.
Apex, Products Brochure, APX 018983-018996, Jan. 7, 1997.
Apex, Products Brochure, APX 019103-019121, 1995-1996.
Apex, Products Brochure, APX 056304-056346, Oct. 1, 1998.
Apex et al, Products Brochure, APX 316564-316621. Apr., 1993.
Apex et al, Products Brochure, APX 316848-316909. Apr., 1993.
Apex et al, Products Brochure, APX 316910-316969. Apr., 1993.
Apex's Sales Brochure, Sept. 1, 1998, 1 page
Apex, SwitchBack User Guide, 1995.
Apex's Motion on the PolyCon Catalog and Supporting Memorandum, Jan. 15, 2002.
Apex's Proposed Markman Findings, Jan. 25, 2002.
Appendix1 to Apex's Proposed Markman Findings, Jan. 25, 2002.
Badman, Switching into High Gear, Network Computing, Apr. 30, 2001.
Belkin, the OmniView Pro User Manual, Jul. 16, 2001.
Bruce McNair Deposition Transcript, Case No. 01-CV-4435, May 5, 2005.
Compaq, White papers, 1996, APX 083313-APX 083326, APX 083335-APX 083389.
Ching-I Hsu Deposition Transcript, Case No. 01-CV-4435, Mar. 11, 2005.
Cybex, Director Installer/User Guide, Nov., 1996.
Cybex, 4×P&1×P KVM SWITCHES Guide to Applications, 1996.
Datavision, Product Brochure, 1992, 3 pages.
Declaration of Joseph C. McAlexander in Support of Apex's Motion for a Preliminary Injunction, Sep. 17, 2001.
Declaration of Joseph C. McAlexander, III in the Civil Action No. 01-CV-4435, Dec. 15, 2004.
Declaration of Sharad Malik, Ph. D., Jan. 8, 2002.
Declaration of Sharad Malik, Ph.D. (Jan. 18, 2005).
Defendant Raritan Computer Inc.'s Claim Construction Statement (Dec. 15, 2004).
Defendant Raritan Computer Inc.'s Motion for Partial Summary Judgment (Jan. 8, 2002).
Defendant Raritan Computer Inc.'s Proposed Findings of Fact and Conclusions of Law, Apr. 27, 2005.
Defendant Raritan Computer Inc.'s Reply to Avocent's Proposed Claim Constructions (Jan. 18, 2005).
Defendant Raritan Computer Inc.'s Reply to Avocent's Proposed Claim Constructions (Jan. 18, 2005 ).
Defendant Raritan Computer, Inc.'s Response to Plaintiffs Second Set of Interrogatories (Nos. 9-12), Oct. 30, 2001.
Defendant Raritan Computer, Inc.'s Second Set of Interrogatories to Plaintiff Apex, Nov. 16, 2001.
Defendant Raritan Computer, Inc.'s Supplemental Response to Plaintiffs First Set of Interrogatories (Nos. 9-12), Aug. 31, 2001.
Defendant Raritan Computer, Inc.'s Supplemental Response to Plaintiffs Second Set of Interrogatories (Nos. 9-12), Dec. 12, 2001.
Dei, Central Control of Multiple PCs Without Massive Cabling, product brochure, Nov. 1992.
Expert Report by Joseph C. McAlexander Regarding Infringement and Validity of U.S. Patent Nos. 5,884,096, 5,937,176 and 6,112,264, Jan. 3, 2001.
Expert Report by Joseph C. McAlexander Regarding Infringement and Validity of U.S. Patent Nos. 5,884,096, 5,937,176 and 6,112,264, Jan. 3, 2001. Claim Charts.
Expert Report of Michael H. Davis, Jan. 13, 2002.
Expert Report of Sharad Malik, Regarding Noninfringement and Invalidity of U.S. Patent Nos. 5,884,096, 5,937,176 and 6,112,264, Jan. 13, 2002. (Unexecuted).
File History of U.S. Patent No. 5,721,842, Feb. 24, 1998.
File History of U.S. Patent No. 5,732,212, Mar. 24, 1998.
File History of U.S. Patent No. 5,884,096, Mar. 16, 1999.
File History of U.S. Patent No. 5,937,176, Aug. 10, 1999.
File History of U.S. Patent No. 6,112,264, Aug. 29, 2000.
File History of Reissue U.S. Patent No. 5,732,212, Apr. 11, 2002. Part 1.
File History of Reissue U.S. Patent No. 5,732,212, Apr. 11, 2002. Part 2.
File History of U.S. Appl. No. 10/032,325, Jun. 14, 2004.
Findings and Conclusions, *Apex v. Raritan*, Civil Action No. 01-CV-0035, Feb. 25, 2002.
Investor's Business Daily, Box Keeps Monitors, Mice to a Minimum, Sept. 8, 1997.
Joseph C. McAlexander Deposition Transcript, Case No. 01-CV-4435, Apr. 27, 2005.
KVM Switch History, Aug. 2, 2002, 2 pages.
KVM Switches Roundup, Windows NT Magazine, Jul. 1997.
Lan Times, The beauty of Apex is a two-sided story, Nov. 20, 1995.
Lightwave Communications, Inc., Product Brochure, APX 304594-304605, Jun. 1, 1998.
Lu, E&J Int. 4-Port KVM Switch, Jul. 4, 2001.
Marksman Transcript, *Avocent v. Raritan*, Civil Action No. 4435, Feb. 3, 2005.

Marksman Transcript, *Avocent v. Raritan*, Civil Action No. 4435, Feb. 4, 2005.
Memorandum and Order on Marksman issues, Case No. 01-CV-4435, (Mar. 11, 2005).
Network Computing, Product Brochure, May 15, 1995, 5 pages.
Network Technologies Inc., Product Brochure, 1998, 2 pages.
Network World, advisement, Jul. 6,1992.
Ocean Isle, Reachout Product Brochure, RCI 172996-173006, Jun. 1994.
PC World, New Products, May 1995, 2 pages.
PolyCon GmbH Data System Inc., product catalogs, APX 024328-042697, prior to Spring, 1995.
Press Release, Maintain Error-Free Central Control of 128 PCs from One Set of Keyboard, Mouse, and Monitor, Feb. 4, 1999, 1 page.
Protest Under 37 CFR 1.291 Filed in U.S. Appl. No. 08/969,723, Feb. 13, 1999.
Raritan, CompuSwitch, Mar. 16, 1998, 1 page.
Raritan, Dominion KSX, Jul. 19, 2003, RCI 139356-139371.
Raritan, Dominion KX and Dominion KSX, 2004, 181193-181211.
Raritan, MasterConsole MXU2, Jul. 31, 2001.
Raritan, MasterConsole II, User's Manual, 2000.
Raritan, Paragon UMT2161, RCI 147483-147505, Jul. 5, 2002.
Raritan, Paragon User's Guide, Jun. 15, 2000.
Raritan, Paragon II User Manual, 2004.
Raritan, Products Brochure, 2004-2005, p. 185899-185912.
Raritan, Product Introduction, Oct. 23, 2000.
Rebuttal Expert Report of Joseph C. McAlexander Regarding Validity and Infringement of U.S. Patent Nos. 5,884,096, 5,937,176 and 6,112,264, Apr. 11, 2005.
Rextron, Product Brochure, Aug. 1, 2002, 5 pages.
Rose Electronics, "Master Switch Installation and Operation Manual," 1991.
Rose Electronics, UltraView Installation and Operation Manual, 1991-1997.
Rose Electronics, Ultra View, Aug. 1, 2002, RCI 173332-173336.
Startech Computer Products Ltd., Product Press Release, APX 304618-304619, Feb. 1998.
Supplemental Expert Report of Bruce McNair Regarding United States Patent Nos. 5,884,096 & 6,112,264 and 5,937,176, Apr. 17, 2005.
Supplemental Expert Report of Joseph C. McAlexander Regarding Infringement of U.S. Patent Nos. 5,884,096, 5,937,176 and 6,112,264, Mar. 22, 2005.
Supplemental Expert Report of Michael H. Davis, Apr. 18, 2005.
SwitchCom, ProServer, Aug. 1, 2002, 2 pp.
Tikkler, Belkin OmniView SE 4-Port KVM Switch, Nov. 8, 2000.
Tony Dekerf and Gary D. Davis, "A Close Look At Modern Keyboard, Video & Mouse Switches," 1995.
Trial Transcript, *Apex v. Raritan*, Southern District of New York, Case No. 01-CV-4435, vol. 1, Jan. 2002.
Trial Transcript, *Apex v. Raritan*, Southern District of New York, Case No. 01-CV-4435, vol. 2, Jan. 2002.
Trial Transcript, *Apex v. Raritan*, Southern District of New York, Case No. 01-CV-4435, vol. 3, Jan. 2002.
Trial Transcript, *Apex v. Raritan*, Southern District of New York, Case No. 01-Cv-4435, vol. 4, Jan. 2002.
Trial Transcript, *Apex v. Raritan*, Southern District of New York, Case No. 01-CV-4435, vol. 5, Jan. 2002.
Trial Transcript, *Apex v. Raritan*, Southern District of New York, Case No. 01-CV-4435, vol. 6, Jan. 2002.
The International Search Report and Written Opinion issued on Sep. 19, 2007, in PCT application No. PCT/US06/38567.
The Office Actions issued in U.S. Appl. No. 10/988,184. (Sep. 14, 2007, Apr. 9, 2008, Aug. 21, 2008, Feb. 19, 2009).
The Office Action issued in U.S. Appl. No. 10/666,940. (May 24, 2006).
The Office Action issued in U.S. Appl. No. 10/799,349. (Jun. 13, 2007).
The Office Action issued in U.S. Appl. No. 10/898,001. (Sep. 5, 2008).
The Office Action issued in U.S. Appl. No. 11/102,450. (Oct. 3, 2008).
The Office Action issued in U.S. Appl. No. 11/241,845. (Jun. 4, 2008).

* cited by examiner

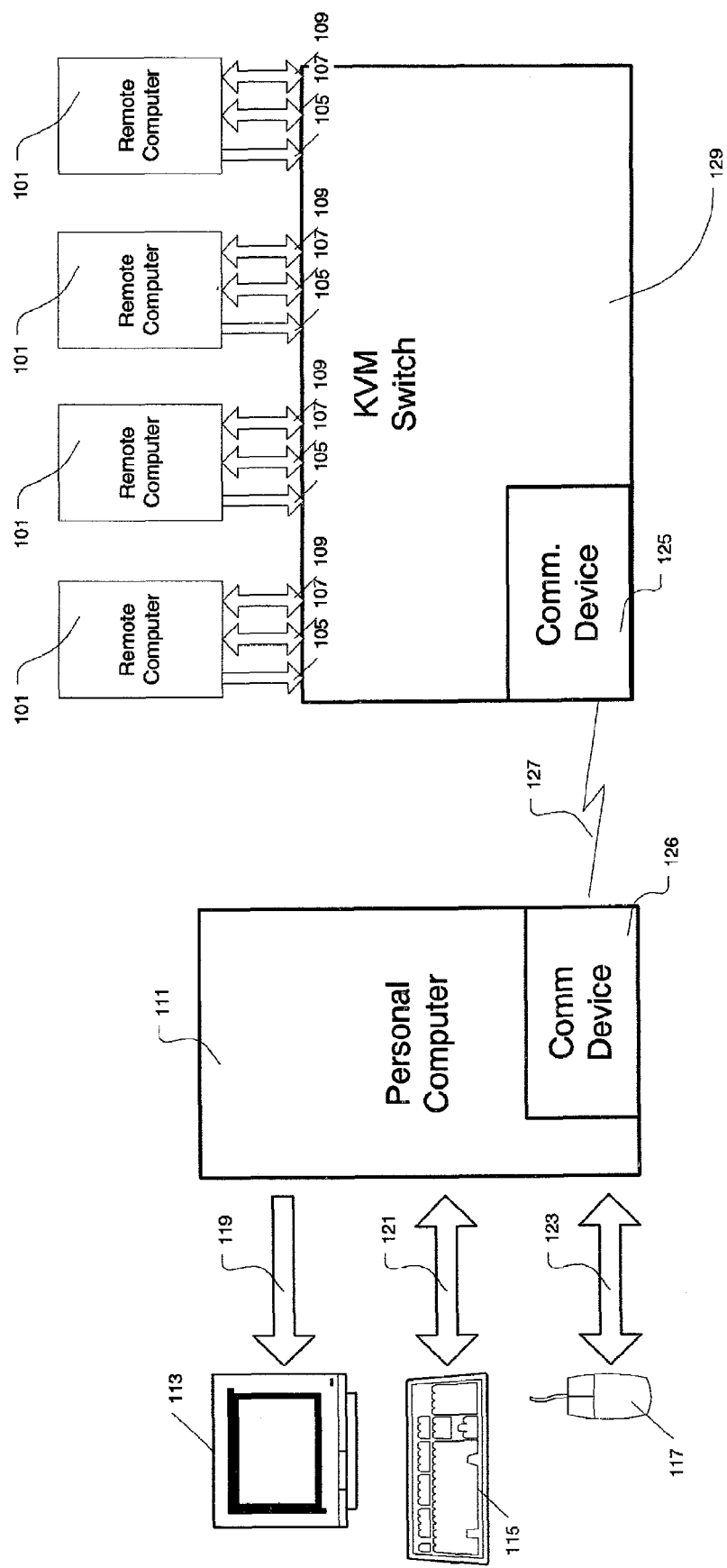

METHOD AND APPARATUS FOR DIGITIZING AND COMPRESSING REMOTE VIDEO SIGNALS

TECHNICAL FIELD OF THE INVENTION

The present invention is directed generally to the field of the compression and digitization of analog video. More particularly, this invention relates to a method of effectively digitizing and compressing the video output of a computer such that it may be monitored and controlled from a remote location.

BACKGROUND OF THE INVENTION

The trend towards distributed computing, coupled with the pervasiveness of the Internet, has led to a decentralization of resources, such as files and programs, for users and system administrators. As this trend of decentralization continues, user information and data has the potential of being stored on servers and computers remotely located all over the world. As this decentralization expands, system administrators have the task of monitoring and updating computers spread over great distances. The task of monitoring and maintaining these computers is physically trying, if not impossible without a method of easily accessing and controlling the remotely located computers.

To this end, hardware and software solutions have been developed which allow users to access and control computers remotely. Early solutions included software programs that allowed text based control of remotely located computers. An example of this would be a user running a telnet program on a simple Windows-based computer to access files and run programs on a UNIX server. In this implementation, a telnet server or "daemon" is installed and started on the UNIX server. The daemon continually runs on the machine searching for and responding to new requests. A user wishing to access information on that machine starts a telnet client program which allows the user to issue a request to the daemon. After verification of the user's identity, the user has access to all of or a portion of the information on the accessed remote computer. The method is useful, but in many instances has limitations and many drawbacks.

For example, in a Windows-based computer with a telnet operation, the telnet access is dependent upon the server not crashing and continually running the telnet daemon. If the server fails, crashes, or stops this daemon, a system administrator must physically restart the remote computer or the daemon on-site. Thus, this scheme is reliant on both a robust server and a robust daemon. Furthermore, the telnet programs are normally limited to text.

More advanced software programs have been developed that allow for graphical user interfaces and greater degrees of control. Examples include Windows® XP® remote desktop, and common PCAnywhere® programs. In many of these solutions, the user can control and view the remote computer, as if it were local, with full control of the mouse and keyboard. However, like the telnet scheme, these solutions rely on software running on both the client computer and the server computer device. Specifically, the server has a daemon program similar to the daemon used in the telnet scheme. If the daemon fails, the local computer will lose control of the remote computer. Like the telnet solution, these graphical solutions still rely on software and are thus faced with substantial limitations.

Another major drawback of these software solutions is the consumption of processing power on the remote computer. Specifically, the daemon program requires resources such as memory and microprocessor execution time from the server. In addition, once the connection is established, these solutions normally use the remote computer's existing modem or Internet connection. Thus, these software solutions consume a substantial portion of the bandwidth available to the server. Both the bandwidth consumption and the power consumption can severely degrade the performance of the server.

In addition, the server software does not allow the system administrator full access to the remote computer at all times. For example, while the computer is rebooting and starting the operating system, the daemon program is not running. Therefore, the system administrator does not have access to the server during these periods. This is a major pitfall especially if the system administrator wishes to view or edit BIOS settings or view the server restart.

To avoid the aforementioned pitfalls of these software solutions, system administrators use hardware solutions which are less reliant on the remote server in order to function. For example, keyboard, video, and mouse ("KVM") switches have been developed that allow a single keyboard, video, and mouse to control multiple computers. The computers are often remotely located from the user or system administrator's computer (i.e., the local computer). These switches route the keyboard and mouse signals of the user computer to one of the remotely located computers chosen by the user. Similarly, the video output of the chosen computer is routed to the attached local monitor. Generally the user is able to switch to any of a series of remote computers.

A KVM switch is useful for many reasons. For example, if a user has many computers, and wants to save space or cost by eliminating extra mice, keyboards, and monitors for each remote computers. The cost and space saving technique is very practical in many environments including server-farms and web-hosting facilities where space constraints are crucial.

Additional hardware solutions include intermediate routers and cables that increase the distance that may separate a user and a remote computer. These solutions can also increase the number of computers a user may control with one keyboard, monitor, and mouse. However this network is separate from existing LANs and Internet connections and may be hampered by a distance limitation.

The KVM switches have advantages over software solutions because they are not reliant upon the remote computer to function. If a system administrator needs to control and view a computer during "boot up" or to fix a problem with BIOS, the user can accomplish this via a remote keyboard, mouse and monitor linked via a KVM switch. Conversely, this would not be possible with a software solution.

Further, the KVM switch does not use processing power on the remote computer. From the point of view of both the controlled computer and the local computer, it is as if the video, mouse and keyboard are directly connected to the remote computer. Thus, no additional resources on the host computer are consumed.

Further, it is easier to make KVM switches that are operating system and machine independent. As long as the KVM ports are compatible with the keyboard, video and mouse connections, and with the output/input ports of the target computer, any KVM switch can be used, regardless of the operating system. With software solutions, a separate version of the software is generally needed if the user must control a variety of computers with a variety of operating systems.

Although KVM switches greatly improve the control of remote units, generally KVM switches rely on direct connections for sending signals from the host computer to the keyboard, video, and mouse that degrade over distances. For example, after a certain distance, the signal degradation affects the quality of the video signal transmitted. Therefore, if a system administrator or user needs access to a computer, the user still has to be within a certain distance of the computer.

In order to circumvent this transmission quality degradation over extended distances a KVM switch whereby the keyboard, video, and mouse signals are sent over standard Internet protocols or telephone connections maybe utilized. This allows any Internet or modem enabled device with a keyboard, video and mouse to control a remote computer regardless of the physical distance between a user computer and a remote device.

However, it has been proven in the art that the creation of such a system is much more difficult to implement than a direct wired KVM switch. In order to send video, keyboard, and monitor signals using a protocol such as those used on the Internet (e.g. TCP/IP, UDB) such analog signals must first be converted to digital signals. The digital signals, in uncompressed form, require a large bandwidth to be transmitted in near real-time. Generally, even high-speed connections such as cable and DSL are incapable of accommodating such bandwidth requirements. Furthermore, a majority of home users still connect to the Internet via a modem with further bandwidth limitations. Therefore, in order for such a device to be useful in these situations, the analog outputs of conventional monitors must be both converted to a digital signal and compressed.

Video compression takes advantage of the redundancies in video signals, both between successive frames of video, and within each individual frame. The transmission of a video signal from a computer monitor output generally has large amounts of both spatial and interframe redundancies. For example, in a near idle computer, the only change between successive frames of video might be the blinking of a cursor. Even as a user types a document, a majority of the screen does not change over periods of time.

Existing video compression standards are designed for common video applications. Generally, these compression systems are inappropriate for KVM switch application since these systems do not take into account specific KVM architecture. There exists a need in the art for a specialized KVM-specific algorithm capable of taking advantage of temporal redundancy, yet still capable of transmitting changes without a large loss of information.

Further, most forms of video compression known in the art require complicated calculations. For example, the MPEG standards use the discrete cosine transform as part of the compression algorithm. This standard relies on the recognition of "motion" between frames to calculate motion vectors to describe how portions of the image are affected over a period of time. These calculations are complicated and require a combination of expensive hardware, or result in extended transmission periods due to increased computation time.

Finally, many of the existing video compression techniques are lossy (i.e. they reduce the amount of information transmitted in order to reduce bandwidth). Typically, such lossy techniques either reduce the detail of an image or reduce the number of colors. Although reducing colors could be part of an adequate compression solution for computer monitor output, excessive reduction of images may yield a poor video transmission resulting in an illegible video reproduction. For example, if a computer user were attempting to use a word processor, reducing detail could lead to blurry or illegible text.

The field of compression and digitization of computer video through a video switch has seen explosive development over the years allowing the transfer of video data over extended distances at increased speed of transfer. For example, in a primitive form, in 1992 and 1993, Apple Computer developed a technology whereby one computer was controlled by another computer via emulation of keyboard and mouse protocols. This technology was implemented as part of a computer on a card "product." The product consisted of a full computer developed on a single card that was designed to directly plug into a standard Macintosh computer. This Macintosh computer controlled the computer on a card via the keyboard and mouse emulation technologies. However, the video out from the computer on a card was routed to the Macintosh display in analog form. A digitization or compression method was not implemented, nor was a means for transmission of the video over great distances.

Other known methods in the art provide systems for converting VGA output to NTSC video. Such products (for example, TView Gold from Focus Enhancements of Campbell Calif.) allowed a computer's output to be viewed on a standard television. Over the years, numerous products have incorporated such technology whereby the output from a PC was digitized and displayed on a television screen. These products allowed the PC to be controlled via keyboard and mouse emulation. The user inputted keyboard and mouse signals into the apparatus, which manipulated and routed the signals to the PC. Although the system digitized video signals from a PC and completed some analysis to determine the size of the video, no compression methods were implemented.

Other products known in the art exist that convert video images from a Macintosh computer to a NTSC video output for display on a television screen. Generally, these products are cards that plug directly into a specific platform such as a Macintosh computer and are only capable of operating with this type of system. A common example of this product is called an L-TV. The L-TV product is designed such that it can read directly from the video memory of the Macintosh computer. In addition, some video compression techniques are used in the L-TV product such that only portions of the image that change between frames are retransmitted. However, by reading directly from video memory, L-TV only functions with a Macintosh computer. Other advances in the art are development of software based simulation systems.

Several patents are directed to the filed of compression and digitization of computer video signals. In addition, in certain instances, some of these systems operate in an environment of a user computer controlling a remote computer.

For example, Widergren U.S. Pat. No. 4,302,775 discloses a method for comparing sub blocks of an image between successive frames of video and only encoding the differences between the blocks for transmission. In Widergren, the block-by-block comparisons are completed in the transform domain. Thus the system requires extra computations necessary to compute the transform of the image thereby increasing the time necessary to complete the video compression. In order to obviate the problem and reduce transmission times, the disclosure of Widergren requires faster or more complex hardware. The present invention improves upon these time consuming extra computations by completing the block comparisons in the spatial domain. For example, the present invention utilizes a two-level thresholding method to ensure that the block comparisons are effective.

Santamäki et al. U.S. Pat. No. 4,717,957 teaches a method of caching previously occurring frames to decrease the necessary bandwidth for transmission of video. The process disclosed compares pixels from previous frames and only retransmits the changes between the pixels. Art disclosed before Santamäki compared a current frame of video with only the previous frame. Santamäki teaches a method that improves on previously existing art by adding a reference memory which may be used to store more than just the previous frame. Therefore, Santamäki teaches a method where the size of the cache is increased, thereby increasing the likelihood that a new frame of video will not have to be retransmitted.

The present invention improves on this disclosure by using two separate methods of storing previous frames and comparing the current frame of video with the previous frame. Furthermore, the present invention improves upon the efficiency of the cache comparisons by comparing the cyclic redundancy check for each block being compared.

Carr et al. U.S. Pat. No. 5,008,747 discloses a method for block-by-block comparison of sequential frames of video. Only changed pixels are retransmitted between frames of video. Carr et al. teaches a method whereby the changed pixels are stored in a matrix which is vector-quantized to one of a standard set of matrices. Thus Carr et al. discloses a video compression technique that uses temporal redundancies to reduce the data that must be transmitted. However, Carr et al. fails to disclose a method and apparatus capable of providing a reduced-time transmission of video. Further, Carr et al. fails to disclose a method of quantizing pixels before comparing frames. Thus the disclosures of Carr et al. would not be suited for remotely controlling a computer because it fails to teach methods that take into account noise that maybe introduced into the video through digitization errors.

Astle U.S. Pat. No. 5,552,832 discloses a camera that receives analog video signals and converts said signals to digital signals by implementing a microprocessor that divides the signals into blocks. The blocks of video are then classified and run-length encoded. Thus Astle discloses a video compression method that operates on blocks of pixels within an image. The present invention improves upon the compression techniques disclosed by taking advantage of temporal redundancies between images. Further, the present invention increases redundancy through noise elimination and a color lookup table.

Perholtz et al. U.S. Pat. No. 5,732,212 discloses a method for digitizing video signals for manipulation and transmission. The patent discloses a method whereby video raster signals from the data processing device are analyzed to determine the information displayed on a video display monitor attached to the data processing device. Perholtz et al. teaches a method for digitizing and compressing video. However, the method compresses video by analyzing the content of the video and sending said content. Thus in general, Perholtz does not teach a method in which the full graphical interface is displayed to the user. The present invention improves upon the disclosure of Perholtz by providing an improved graphical interface to the user. Further, the present invention improves upon this disclosure by compressing the video based upon spatial and temporal redundancies.

Frederick U.S. Pat. No. 5,757,424 discloses a system for high-resolution video conferencing without extreme demands on bandwidth. The system disclosed creates a mosaic image by sampling portions of a scene and combining those samples. This system allows for the transmission of video over low bandwidths. Frederick's system in general is used within a camera for transmitting video. Though Frederick teaches a way to reduce the data necessary for transmission, Frederick does not teach methods for comparing frames of video. In addition, Frederick does not teach a system whereby the video that must be sent is compressed using lossless compression. The present invention overcomes the limitations of Frederick's disclosures by using lossless compression in the spatial domain and two temporal redundancy checks. Further, the present invention teaches video compression in the context of controlling a remote computer rather than in the context of transmitting video from a camera.

Schneider U.S. Pat. No. 6,304,895 discloses a system for intelligently controlling a remotely located computer. Schneider further discloses a method of interframe block comparison where pixel values that even slightly change are retransmitted. This necessarily leads to retransmission of noisy pixels unnecessarily. In another embodiment, Schneider will retransmit an entire block if a threshold percentage of pixels within the block have changed.

For example, if all pixels in the current frame change from black to a dark gray due to noise introduced by the A/D conversion, all pixels will also be retransmitted unnecessarily because the total percentage (i.e. 100% of the pixels) would clearly exceed any predetermined percentage threshold. Schneider also fails to take into account legitimate changes. For example, an intended change to only a few pixels, e.g., 5 pixels, will be missed if the threshold is set to 6 pixels.

The present disclosure overcomes these shortcomings by recognizing minor changes due to noise, by implementing a more efficient calculation method and with a cache capable of storing previous blocks. Furthermore, the present disclosure recognizes significant changes (i.e. a pixel changing from black to white due to a cursor). In addition, slight color variations will be smoothed due to the color code and noise reduction methods of the present invention.

Pinkston U.S. Pat. No. 6,378,009 teaches a method of sending control, status and security functions over a network such as the Internet from one computer to another. Although Pinkston discloses a switching system that packetizes remote signals for the Internet, no video compression methods or conversions are disclosed. Instead, Pinkston teaches a method whereby a system administrator can access a KVM switch remotely over the Internet and control the switch. Therefore, in and of itself, Pinkston's disclosures would not allow a remote computer to be operated over a low-bandwidth connection.

The digitization of a video signal and its subsequent compression allows a computer to be controlled remotely using standard Internet protocols. The compression allows an interface to utilize digital encryption techniques known in the art. Non-digital KVM switches, in transmitting analog signals, do not allow or interface well with digital encryption schemes, such as 128-bit encryption. If a computer with sensitive information needs to be controlled from a remote location, there needs to be protection from potential hackers or competitors.

Therefore, what is needed is an Internet, LAN/WAN, or dial-up enabled KVM switch that allows for near real time transmission of compressed video. The compression must be efficient enough to transmit video in near real-time over modem bandwidths. However, the compression must not be too lossy, because the resulting image must be discernible. Finally, the KVM switch should work across multiple platforms (e.g. Macintosh, IBM compatible, and UNIX). Therefore, the switch cannot take advantage of platform dependent GDI calls, or similar system dependent codes which indicate when and where updates in the video are needed.

Based on the aforementioned disclosures and related technologies in the art, it is clear that there exists a need for a video compression method designed specifically for remotely monitoring and controlling a computer that is accurate and virtually provided in real-time. Furthermore, there exists a need in the art that allows for platform independent monitoring of computers, even at limited bandwidths provided by standard modem connections.

SUMMARY OF THE INVENTION

Most systems employed in the art for compressing and digitizing video signals fail to efficiently transmit synchronized video data. Therefore, the present disclosure provides an improved video compression algorithm that offers efficient bandwidth usage and accurate video transmission. The present invention is directed to keyboard, video, and mouse control systems. The disclosure relates to a method and device for the digitization and compression of video signals such that the signal is transmitted via a modem, Internet connection, LAN/WAN, etc. The present invention includes a corresponding decompression technique that allows video signals to be displayed on a monitor. More particularly, in the preferred embodiment, this compression technique allows for the viewing of a remote computer's video output on a local video output device such as a monitor. Furthermore, the invention can be interfaced with a KVM switch so that multiple remote computers can be controlled and monitored.

In the present invention, the keyboard and mouse signals are transmitted over standard modem and Internet connections synchronized with the video transmission. In the preferred embodiment, the video signal is transmitted from a remote computer to a local computer whereas the keyboard and mouse signals are transmitted from the local computer to the remote computer.

The present invention allows for platform independent communication between computers. Thus, the local computer can control one or more remote computers utilizing a variety of computer platforms, including, but not limited to Windows, Mac, Sun, DEC, Alpha, SGI, IBM 360, regardless of the operating system of the local computer.

The present invention may be used to control a remote serial terminal device, such as a printer, fax machine, etc. In the preferred embodiment, a serial terminal device can be connected directly to the present invention or through a serial concentrator and can be controlled from the local application. In another embodiment, the serial concentrator is linked with the keyboard, video, and mouse.

Accordingly, the device uses compression techniques that have been designed to improve video transfer times for video having characteristics exhibited by computer monitor output. The compression can be accomplished using readily available hardware providing a viable device that would allow a remote computer to be controlled via a local keyboard, video and monitor equipped computer, so long as the remote device and the local keyboard, video and monitor can communicate via the Internet, a direct modem connection, or a LAN/WAN etc.

Noise Reduction:

Since the system allows for platform independent communications, the video compression does not use operating system specific hooks, nor does the compression employ platform specific GDI calls. Instead, the algorithms take advantage of spatial and temporal redundancies in the video. In the first step of the video compression method, analog video is sent to an A/D converter. The digitization of the analog video is necessary in order for the video to be transmitted using an Internet protocol. However, a detrimental side effect of the digitization process is the introduction of quantization errors and noise into the video.

Therefore, the next step in the present invention is to eliminate the A/D conversion noise via histogram analysis. This noise elimination is done by first dividing a frame of video into logical two-dimensional blocks of pixels. Many different sizes of blocks may be used, for example 8×8 pixels, 32×32 pixels, 64×32 pixels, etc. Different block sizes may be used depending on the size of the entire image, the bandwidth of the connection, etc. After the image is divided into blocks, the noise reduction algorithm is completed on each block separately.

For each block, a histogram of pixel values is created and sorted by frequency so that it is possible to identify how often each pixel value occurs. Less frequent pixel values are compared to more frequently occurring pixel values. If the less frequently occurring pixels are close in pixel value to the more frequently occurring pixel values, color values are mapped to the closest high frequency pixel value. To determine how close pixel values are, a distance metric is used based on the red, green, and blue ("RGB") components of each pixel. In alternative embodiments, a similar distance metric can be used, based on the appropriate components of the pixel for that embodiment.

The purpose of the noise reduction algorithm is to increase the redundancy in an image by eliminating the superfluous noise introduced by the A/D converter. For example, suppose an 8×8 pixel block size is used and the algorithm is operating on this particular block. Further, assume that of the 64 pixels in the current block, 59 are blue, 4 are red, and 1 is a light blue. In this example, a low frequency threshold is defined as any pixel values that occur less than 5 times and a high frequency threshold is defined as any pixel value that occurs more than 25 times within a block. In general, pixel values between these thresholds are ignored for the noise reduction analysis. Therefore, the algorithm determines that the 4 red pixels and the 1 light blue pixel occur rarely, and therefore might be noisy.

In the next step, the 4 red pixels and the 1 light-blue pixel are compared with the more frequent pixel values (i.e. in this case the blue value). In this step, a pre-determined distance-threshold is used. If the distance between the less frequent pixel and the more frequent pixel is within this distance-threshold, then the less frequent pixel value is converted to the more frequent pixel value.

In this example, it is likely that the light-blue pixel is close enough in value to the blue pixel. Thus, the light-blue pixel is mapped to the blue pixel. Though the red pixels occur rarely, the distance in value between the red pixel value and the blue pixel value is large enough so that the red pixels are not converted.

Color Look-up Table:

Further disclosed is an efficient method which integrates the aforementioned method of pixel conversion with a color conversion via a color "look-up table." By integrating the pixel conversion methods and the look-up table, both noise elimination and efficient compression can be accomplished simultaneously.

It is commonly known in the art that one method of compressing color video is to use fewer bits to represent each pixel. For example, a common video standard uses 8 bits to represent the red component of video, 8 bits to represent the green component of video, and 8 bits to represent the blue component of video. This representation is commonly referred to as an "RGB" representation. If only the four most significant bits from the red, green, and blue components of the video are used instead of all 8-bits, the total amount of data used to represent the video is reduced by 50 percent.

The present invention uses a more intelligent method of converting an RGB representation of pixels into a compact representation. The method and apparatus of the present invention uses a color look-up table that maps a specific RGB value to a more compact form. Both the compression device and the decompression device use the same look-up table. Further, different look-up tables can be used depending on bandwidth availability, the capabilities of the local display device, etc.

In the present invention, the color look-up table is used to implement the noise reduction color conversion. In the histogram analysis, a map of RGB values to color code values is created. If a less frequently occurring pixel value needs to be adjusted to a similar more frequent color, this is accomplished through the use of the color lookup table. The less frequently occurring color is mapped to the same color code as the highly frequent occurring color. Thus, the noise is efficiently removed from each block, while at the same time, the number of bits used to represent each pixel is reduced.

Temporal Redundancy Checks:

In addition to the methods of noise reduction, improved methods of interframe block comparison are disclosed. Specifically, temporal redundancy is identified and reduced, thereby limiting the bandwidth necessary for transmission of the remote computer video output. There are two methods disclosed for completing the interframe compression. In both methods, each frame or image is delineated into a block of pixels, and compared with the corresponding block of pixels from previously transmitted images. Different embodiments can use one or both of these methods depending on the level of compression desired.

General technologies in the art employ compression systems that are highly susceptible to error and noise. For example, in certain known systems, the current frame of video is compared with the previously transmitted frame of video. Only portions of the image that have changed from the last frame to the current frame are transmitted. Methods to accomplish this are known in the art in which pixels between frames are simply compared for equality. Areas that are no longer the same are retransmitted. Generally, these compression systems are highly susceptible to noise during the analog to digital conversion and create inefficient retransmission of video. For example, if prior art methods were used for retransmitting the image, then often large portions of the image would be resent unnecessarily due to the small error in the image as a result of noise created during the A/d conversion.

To overcome this pitfall, the present invention uses a unique two-level thresholding method to determine if areas of the frame have changed. The present invention uses two frame buffers as input. The first is the newly captured frame buffer. The second is the compare frame buffer. The compare frame buffer contains the image data from previously captured frame buffers.

The algorithm divides each of these frame buffers into blocks of pixels. Any block size may be used including 8×8, 32×32, 64×32 etc, as well as other irregular block sizes. Different block sizes may be used depending on bandwidth requirements, image size, desired compression yields, etc.

The algorithm processes one block of pixels at a time. For each pixel, the algorithm computes the difference between the color components of the current frame buffer pixel and the compare frame buffer pixel. From this, a distance value is computed. This process is done for each pixel in the block.

Each of these distance values is compared with a "pixel threshold." If the distance value exceeds the pixel threshold, the amount it exceeds the threshold by is added to a distance sum. This running sum is calculated based on various equations for all pixels in the block.

The distance sum is then compared with a "cell threshold." If the distance sum exceeds the cell threshold, then the block of pixels is considered changed in comparison to the previous block. If the block of pixels has changed, the compare frame buffer will be updated with this new block. Further, this new block will be sent in a compressed format to the local user.

If the distance sum is not greater than the cell threshold, the block is considered to be unchanged. Neither the compare frame buffer, nor the local user's screen is updated.

This algorithm is ideal for locating areas of change in that it can detect a large change in a few pixels or a small change in a large number of pixels. The method proves more efficient and accurate as compared to an algorithm that simply counts the number of changed pixels in a cell. With such an algorithm, if a very few pixels within the cell changed drastically (for example, from black to white), the algorithm would still consider the cell to be unchanged since the overall summation would not exceed a low threshold. This will often lead to display errors in the transmission of computer video.

Consider, for example, if a user were editing a document. If the user were to change a letter, such as an "E" to an "F," only a few pixels would change in a video representation of that change. However, the result exhibited by these few pixels would be dramatic. A percentage threshold algorithm would not register this change leading to a display error. A percentage threshold algorithm, by only looking at the number of pixels within a block that have changed, generally fails at recognizing a case in which a few pixels change a lot. However, the present invention, by virtue of the two-level thresholding method and apparatus recognizes that the block of pixels has significantly changed between frames of video.

The second temporal compression method relies on a cache of previously transmitted frames. An identical cache is synchronized between the remote device and the user's local computer. Like the previous temporal redundancy check, this second check is performed on a block of pixels within a frame. Again, any block size may be used, for example, 8×8, 16×16, 32×32 or 64×32.

The cache check begins whenever a cell changes. The cache check compares the current block with corresponding blocks from previous frames. The cache can store an arbitrarily large number of previous frames. A higher percentage of cache hits is more likely to occur with larger cache sizes. However, the memory and hardware requirements increase with an increase in cache size. Further, the number of comparisons, and thus the processing power requirements, also increase with a larger cache size. A "cache hit" is defined as locating a matching block in the cache. A "cache miss" is defined as not finding the current block in the cache.

Whenever a "cache hit" occurs, the new block does not have to be retransmitted. Instead, a message and a cache entry ID can be sent to the local computer. Generally, this message and entry ID will consume less bandwidth than retransmitting an entire block.

If a "cache miss" occurs, the new block is retransmitted. Further, both the remote and local devices update the cache, by storing the block within the cache. Since the cache is of limited size, older data is overwritten. One skilled in the art would know there exists various algorithms that can be used in deciding which older data should be overwritten. For example, a simple algorithm can be employed to overwrite the oldest block within the cache. The oldest block can be defined as the least recently transmitted block.

In order to search for a cache hit, the new block must be compared with all corresponding blocks located within the cache. There are several ways in which the new block can be compared with the previous blocks located within the cache.

In the preferred embodiment, a cyclic redundancy check ("CRC") is computed for the new block and all corresponding blocks. The CRC is similar to a hash code for the block. A hash code is a smaller, yet unique representation of a larger data source. Thus, if the CRCs are unique, the cache check process can compare CRCs for a match instead of comparing the whole block. If the CRC of the current block matches the CRC of any of the blocks in the cache a "cache hit" has been found. Because the CRC is a smaller representation of the block, less processing power is needed for comparing CRCs. Further, it is possible to construct a cache in which only the CRCs of blocks are stored on the remote side. Thus, using a CRC comparison saves memory and processor time.

In alternative embodiments, a similar hash code or checksum can be used. Alternatively an algorithm similar to the one used in the first temporal redundancy check can be applied to the cache check. Generally, such an algorithm can be less susceptible to noise.

Other disclosed methods of video compression generally transmit only pixel values that change. For example, a method and apparatus can retransmit a difference frame, whereby only the changes between the current frame and the previous frame are transmitted. Typically, these methods of transmitting difference frames can cause frequent synchronization errors. Further, by retransmitting on a block level, less addressing is potentially needed in determining where each block is located within an image than if the decision to retransmit is performed at pixel granularity.

Compression and Color Look-up Table:

Once the image block-by-block comparison is performed, in the preferred embodiment, each block that must be transmitted is first compressed. In the preferred embodiment, the blocks are compressed using the Joint Bi-level Image Group (JBIG) lossless compression technique.

JBIG is lossless and was designed for black and white images, such as those transmitted by facsimile machines. However, the present invention compresses and transmits color images. Therefore, in order to utilize the JBIG compression technique, the color image must be bit-sliced and the subsequent bit-planes must be compressed separately.

A bit-slice of a color image is created by grabbing the same bit from each pixel across the whole image. The color look-up table uses a compact form in which the most significant bits of each pixel are stored first, and the lesser significant bits are stored last. Thus, the first bit planes will contain the most significant data and the last bit-planes will contain the least significant data.

By combining the JBIG compression technique with the color-lookup-table, the method and apparatus compresses and transmits the most significant bits of the frame first. Thus, the local computer will receive video from the remote computer progressively, receiving and displaying the most significant bits of the image before receiving the remaining bits. Such a method is less sensitive to changes in bandwidth and will allow a user to see the frame of video as it is transmitted, rather than waiting for all details of the frame to be sent.

In an alternate embodiment, the device is also capable of calibrating the analog to digital conversion automatically "on the fly" so that the whole range of digital values is used. For example, if the device is supposed to transmit values between 0 and 255 (i.e., general pixel depth values), but instead only transmits values between 10 and 245, it will dynamically adjust the gain of the A/D converter to take advantage of the full range of digital values. This adjustment can be done for the red, green and blue components on an individual basis or a cumulative basis. By adjusting this range, the user receives more accurate representations of the video.

Decompression:

Further disclosed is a decompression method and apparatus used to receive data from the compression device and convert the data so that it may be displayed on the user's local display device. The decompression device includes a device capable of bi-directional digital communications. Using this communication device, the decompression device is able to receive video data from the compression device and transmit keyboard and mouse data. In an alternate embodiment, the decompression device also includes a means to control a serial device by transmitting serial data. Thus, the decompression device enables a local user to control a remote computer using a local keyboard, video, mouse, and serial device.

The decompression device reconstructs frames of video based on the messages received from the compression device. Thus, the decompression device contains a frame buffer with the most up-to-date video data. The data in the frame buffer is sent to a display device so that the user can view the data from the remote computer.

The image in the frame buffer is constructed using a combination of data from a cache and transmitted data from the remote device. The remote device indicates what areas of the remote computer video yielded "cache hits" and what areas are retransmitted. The decompression device constructs the frame buffer based on these indications.

In addition, further disclosed is a cache that remains synchronized with the cache on the compression device. Thus, whenever the decompression method receives new video data, the cache is updated. Both the compression device and the decompression device use the same method for updating the cache by overwriting older data.

The compression device sends video data that has been compressed using a lossless compression algorithm such as JBIG. Therefore, further disclosed is a method and apparatus which reverses this lossless compression. This decompression method and apparatus recognizes the changed areas of the image based on flags transmitted by the compression device. From this information, the decompression technique reconstructs the full frame of video.

In addition, the frame of video is converted to a format that may be displayed on the local video monitor by reversing the color-table conversion. The decompression method is able to send the raw frame of video to the operating system, memory, or other location such that it may be received and displayed by the monitor.

Therefore, the decompression device, like the compression device stores a local copy of the color-code table. The device can then convert the data from the remote computer into a standard RGB format for display on the local monitor.

The decompression method can be implemented in a variety of ways. For example, in one embodiment, it is implemented as a software application that can be run in, for example, the Windows OS on an Intel Pentium powered PC. In an alternate embodiment, the decompression technique can be implemented such that it may run within a web browser such as Internet Explorer or Netscape® Navigator®. Such an embodiment would be more user friendly, therefore reducing the need for the installation of additional software on the local computer. Finally, in yet another embodiment, the decompression can be implemented in a device composed of a microprocessor and memory. Such an embodiment would further limit the necessary software stored on the local machine.

Security:

Since the present invention is used for controlling a remote computer from great distances, there is a need to ensure that the transmission of the video signals is secure. If not, there exists the potential that hackers or competitors could view or control a user's computer. Therefore, the present invention was designed to easily integrate with digital encryption techniques known in the art. In one embodiment of the invention, a 128-bit encryption technique is used both to verify the identity of the user and to encrypt and decrypt the video stream transmission. A 128-bit public key RSA encryption technique is used to verify the user, and 128-bit RC4 private key encryption is used for the video streams.

In the preferred embodiment, this video compression apparatus and method is used to allow a local computer access to a remote computer. However, the compression and device is not limited to such an embodiment, and can be applied to future needs for the transmission of similar types of video in near real-time over low bandwidths.

The objects described, and further objects will become readily apparent to one skilled in the art upon review of the following description, figures and claims.

BRIEF DESCRIPTION OF THE DRAWINGS

A further understanding of the present invention can be obtained by reference to the preferred embodiment as well as some alternate embodiments set forth in the illustrations of the accompanying drawings. Although the illustrated embodiments are merely exemplary of systems for carrying out the present invention, the organization, expanded configurations and method of operation of the invention, in general, together with further objectives and advantages thereof, may be more easily understood by reference to the drawings and the following description. The drawings are not intended to limit the scope of the invention, which is set forth with particularity in the claims as appended or as subsequently amended, but merely to clarify and exemplify the invention.

For a more complete understanding of the present invention, reference is now made to the following drawings in which:

FIG. 1B illustrates an alternate embodiment, in which the compression device is combined with a KVM switch, such that a local user can control one of many remote computers.

DETAILED DESCRIPTION OF THE PREFERRED EMBODIMENTS

As required, a detailed illustrative embodiment of the present invention is disclosed herein. However, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention. The following presents a detailed description of a preferred embodiment (as well as some alternative embodiments) of the present invention.

Figure 1A:
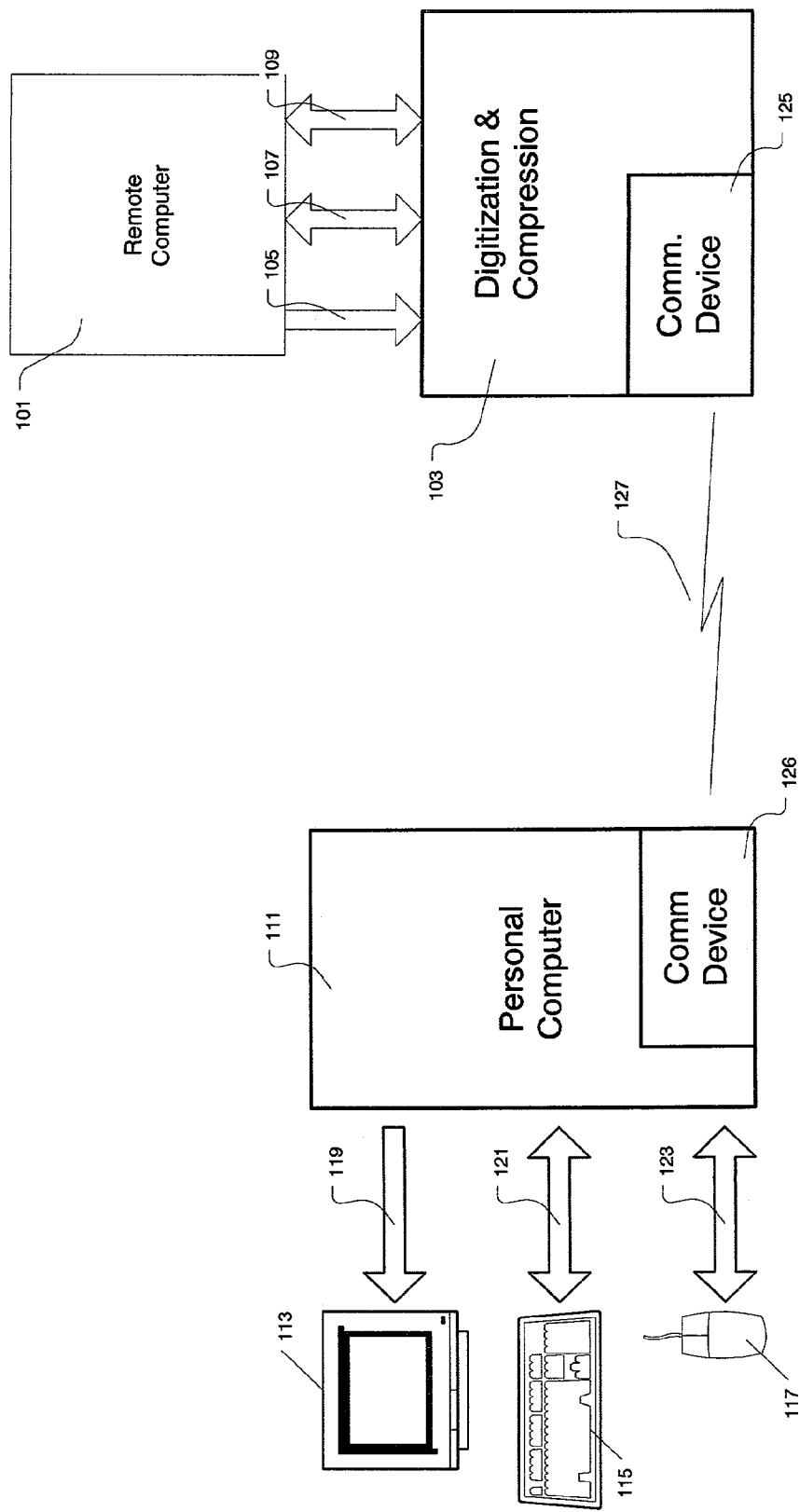
FIG. 1A illustrates an overview of the preferred embodiment of the present invention in which the video compression method and apparatus are utilized between a local computer controlled by a remote computer, so long as both are connected via an agreed upon protocol.

Referring first to FIG. 1A, represented is a block diagram of the preferred embodiment of the present invention including a computer system for accessing and controlling a remotely located computer system, the preferred embodiment in which the present invention would be used. The term "local" will be from the of the user who wishes to access a computer at a remote location. The term "remote" is at a different location from the user, and is accessible via the present invention. Therefore, the phrase "remote computer" refers to a computer with a direct connection to the apparatus of the present invention. For example in FIG. 1A video out of remote computer 101 connects to compression device 103 via standard monitor connection 105. Similarly, keyboard input/output is connected via standard keyboard connection 107 and the mouse input/output is connected to compression device 103 via standard mouse connection 109.

A user accesses remote computer 101 via local computer 111. Local computer 111 is connected to monitor 113, keyboard 115, and mouse 117 via monitor connection 119, keyboard connection 121, and mouse connection 123. In the preferred embodiment monitor 113, keyboard 115, and mouse 117 are wired separately. Specifically, monitor connection 119, keyboard connection 121, and mouse connection 123 consist of separate standard cables known in the art. However, any method of connecting monitor 113, keyboard 115, and mouse 117 to local computer 111 may be used with the present invention. For example, an alternative method is one in which keyboard 115 and mouse 117 connect to local computer 111 via a shared USB connection. In this embodiment, keyboard connection 121 and mouse connection 123 might be one physical cable. In another embodiment, keyboard 115 and mouse 117 can connect to local computer via a wireless connection.

Compression device 103 includes communication device 125, and local computer 111 includes local communication device 126, both of which are capable of bi-directional digital communication via communications path 127. Communication device 125 and local communication device 126 may include modems, network cards, wireless network cards, or any similar device capable of providing bi-directional digital communication. Similarly, communications path 127 may include a telephone, the Internet, a wireless connection, or any other similar device capable of providing bi-directional digital communication. Communication device 125 and local communication device 126 enable compression device 103 and local computer 111 to communicate via any standard agreed upon protocol. Examples of these protocols include, but are not limited to, Transmission Control Protocol/Internet Protocol (TCP/IP), and User Datagram Protocol (UDP).

Compression device 103 receives and analyzes the video signals from remote computer 101 via standard monitor connection 105. Compression device 103 analyzes and converts the video signal so that it may be packaged for transmission via a standard Internet protocol. Local computer 111 receives the transmissions from compression device 103 via the bi-directional communications provided by communication device 125, local communication device 126, and communications path 127 and translates the signal via a decompression technique corresponding to the compression techniques of the present invention.

In addition to receiving monitor signals from compression device 103, local computer 111 receives signals from keyboard 115 and mouse 117 via keyboard connection 121, and mouse connection 123. These signals are packaged on top of a standard Internet protocol, sent to local communication device 126 and transmitted to communication device 125 via communication path 127. Compression device 103 receives these signals from communication device 125 and transmits them to remote computer 101 via standard keyboard connection 107 and standard mouse connection 109. By utilizing the aforementioned method of transmitting keyboard, mouse, and video signals, the present invention allows a user at local computer 111 to control remote computer 101 as if the user were physically located at remote computer 101.

FIG. 1B depicts an alternate embodiment of the present invention in which compression device 103 as depicted in FIG. 1A is combined with KVM switch 129. As shown in FIG. 1B, local computer 111 is capable of controlling either of four remote computers 101. In alternative embodiments, KVM switch 129 can control any series of remote computers 101 in a similar manner. As can be seen, KVM switch 129 has four standard monitor connections 105, four standard keyboard connections 107, and four standard mouse ports 109. Using methods known in the art for controlling a switch such as KVM switch 129, the local user can switch control between each of the four remote computers 101.

Figure 2:
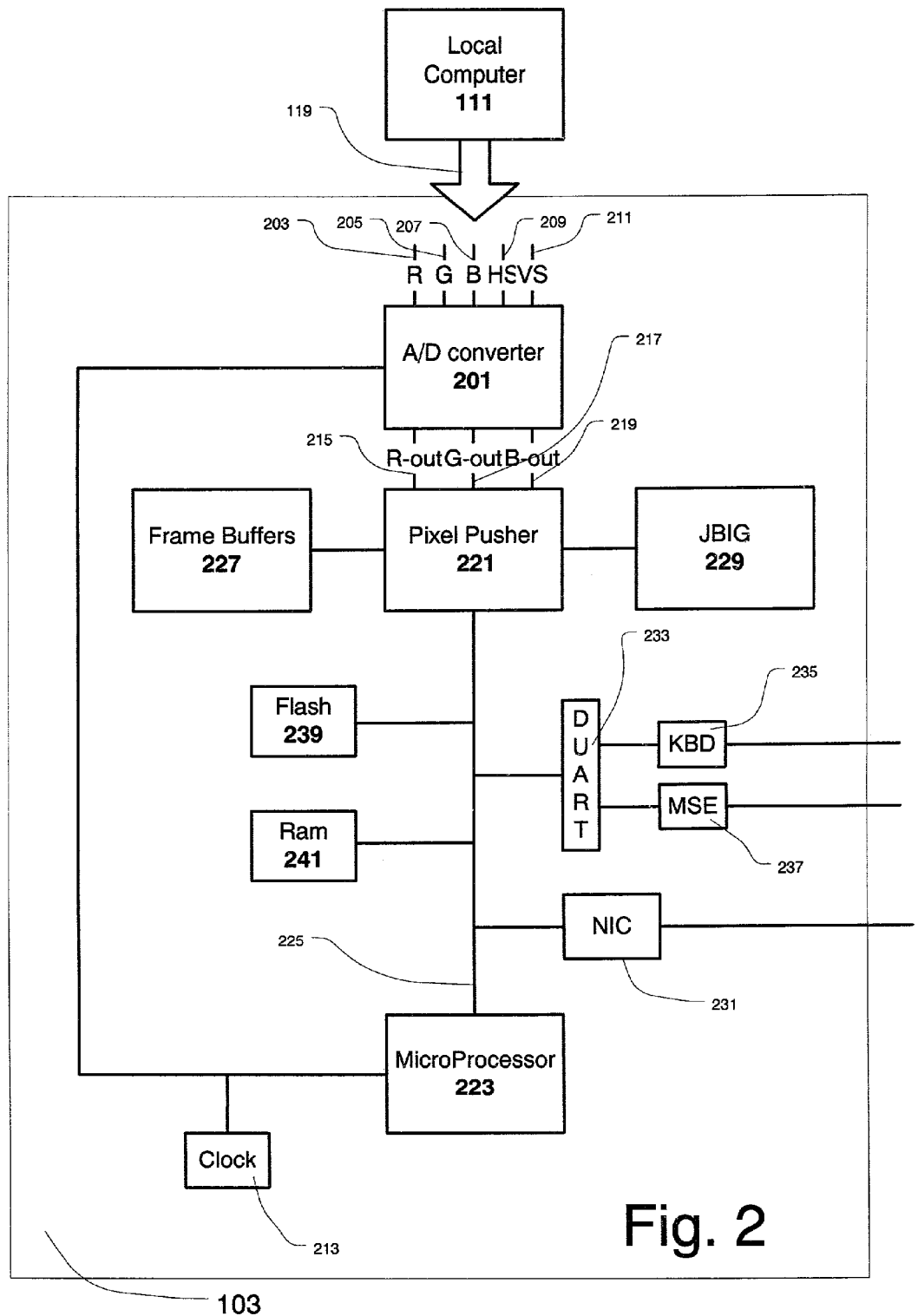
FIG. 2 depicts a block diagram of the preferred embodiment of the compression device including hardware used to interface with the remote computer and the communications device of digitizing and compression signals of the present invention.

FIG. 2 depicts a hardware diagram of compression device 103 of the preferred embodiment of the present invention. FIG. 2 is one embodiment in which the compression and digitization of the present invention may be implemented. One skilled in the art can readily recognize that there exist many other designs that could be used to implement the compression algorithms of the present invention. The first step in compressing the video is the conversion of the video from analog to digital, completed by A/D converter 201. A/D converter 201 receives analog red signal 203, analog green signal 205, analog blue signal 207, horizontal synch signal 209, and vertical synch signal 211. Clock 213 drives A/D converter 201 using means commonly employed in the art. The outputs of A/D converter 201 are shown as R-out 215, G-out 217, and B-out 219. In the preferred embodiment, these outputs are used to represent the red component, green component and blue component of the digitized signal respectively. A/D converter 201 outputs pixels (e.g. one pixel at a time) and the results are stored in pixel pusher 221. Pixel pusher 221 communicates with microprocessor 223 via communication bus 225. Pixel pusher 221 can also communicate with frame buffer 227 and JBIG Compression device 229 using communication bus 225.

Communication bus 225 is connected to network interface card 231 and dual universal asynchronous receiver transmitter (DUART) 233. DUART 233 interfaces with keyboard port 235 and mouse port 237. Thus, A/D converter 201, keyboard port 235, and mouse port 237 allow compression device 103 to interface with remote computer 101. Further, network interface card 231 allows compression device 103 to interface with communication device 125. Compression device 103 receives analog video signals, output keyboard and mouse signals, and communicates with local computer 111 via communication device 125. Finally, by means of JBIG compression device 229, microprocessor 223, flash 239, and random access memory 241, compression device 103 pictured in FIG. 2 can be programmed and configured to implement the video processing methods of the present invention disclosed herein.

Figure 3A:
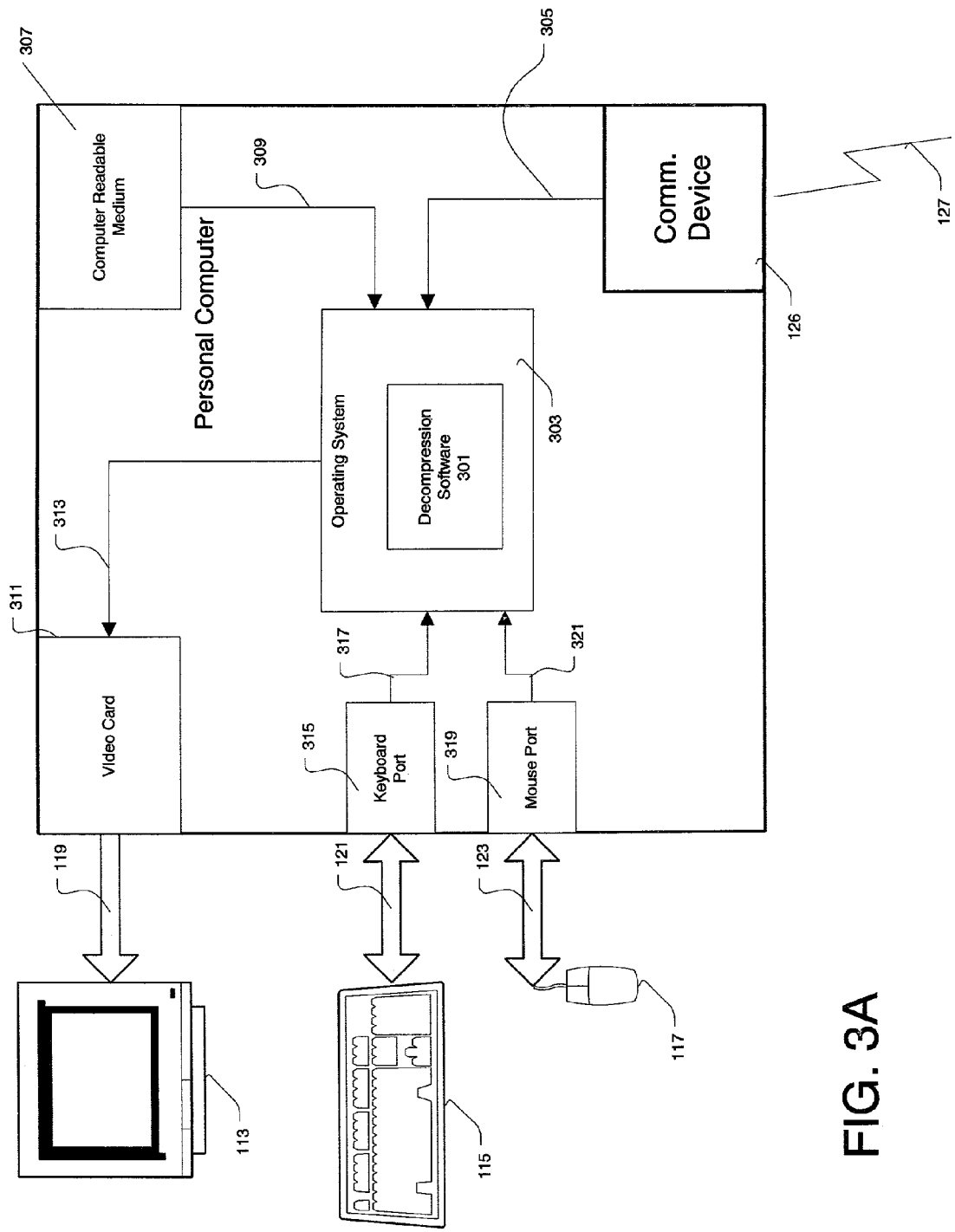
FIG. 3A depicts a block diagram of one embodiment of the decompression device, whereby all decompression is done in software on a local computer.

FIG. 3A illustrates decompression software 301 interacting with local computer 111. Local computer 111 runs operating system 303 capable of receiving data from local communication device 126 via operating system data link 305. Operating system data link 305 utilizes shared memory, a memory bus, or other device drivers. Local communication device 126 receives data from compression device 103 over communications path 127. When a user decides to operate remote computer 101, operating system 303 loads the decompression software 301 like any other process, from a computer readable medium 307 via computer readable medium to operating system data link 309. Decompression software 301 then accesses the data received from local communication device 126. Decompression software 301 is used to decompress data received from local communication device 126 and convert the data into data that can be interpreted by video card 311. The data is then transmitted to video card 311 via operating system 301 where it is then transferred to video card 311 via operating system data link 313.

Similarly, decompression software 301 receives signals from keyboard 115 via operating system's 303 operating system to keyboard connection 315 which connects to keyboard port 317. In a similar manner, decompression software 301 receives signals from mouse 117, via operating system's 303 operating system to mouse connection 319 to mouse port 321.

Figure 3B:
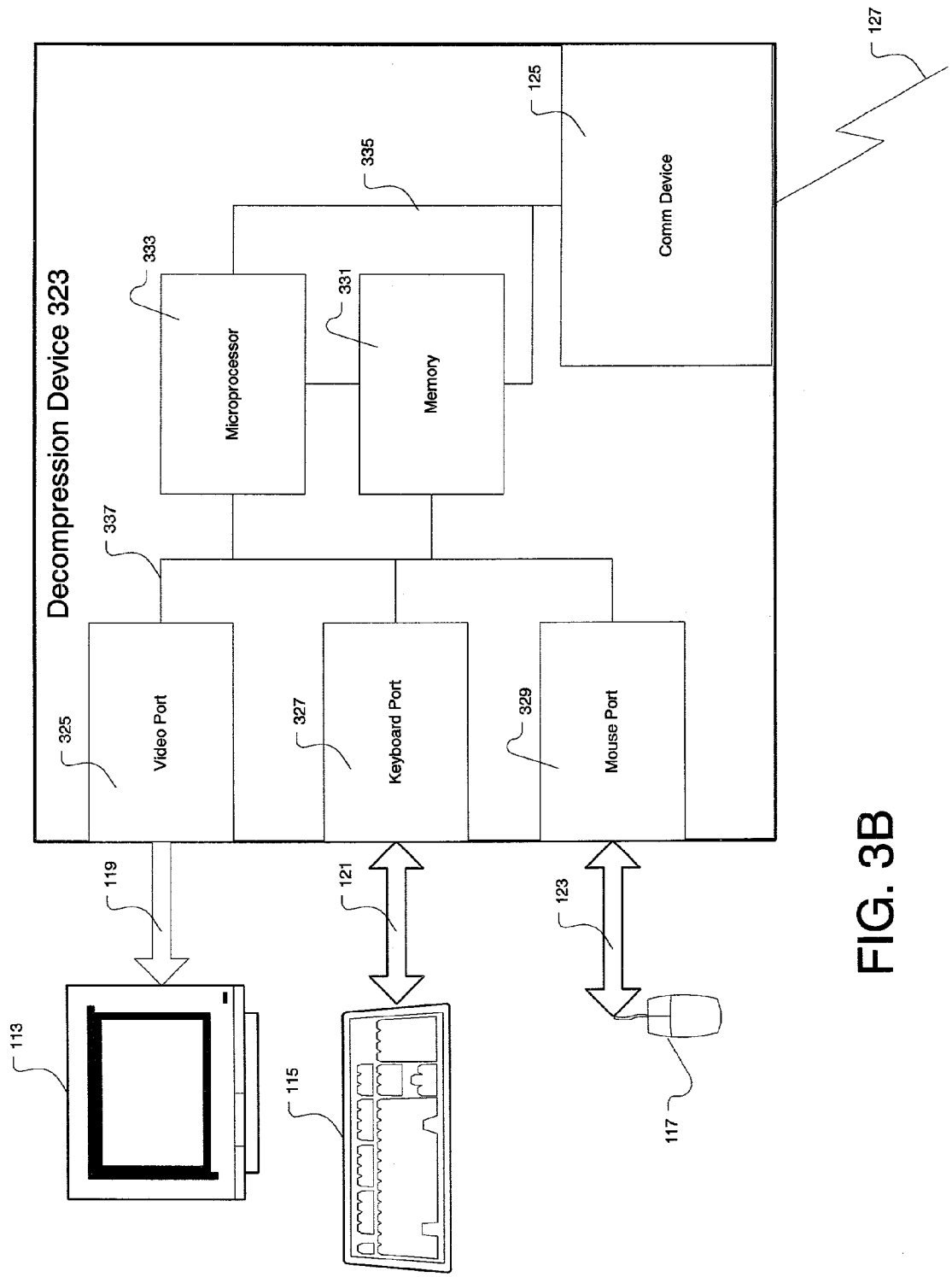
FIG. 3B depicts a block diagram of an alternate embodiment of the decompression device, in which the decompression apparatus is a separate hardware device.

Though having the decompression completed in software is the preferred embodiment, it would be apparent to one skilled in the art, that such decompression could also be completed by means of a hardware solution. For example, FIG. 3B shows a decompression device 323 that can accomplish the same decompression as decompression software 301. In this case, decompression device 323 replaces local computer 111 and further includes local communication device 125. Monitor 113, keyboard 115, and mouse 117 attaches to decompression device 323 via the monitor connection 119, keyboard connection 121, and mouse connection 123 via monitor port 325, keyboard port 327, and mouse port 329 respectively. In this embodiment, the data from monitor port 325, keyboard port 327, and mouse port 329 communicates with memory 331 and microprocessor 333 to run the decompression methods of the present invention.

The decompression method receives data from local communication device 126 and transmits a decompressed version of the data to monitor 119. In this embodiment, there exists a connection between local communication device 126 and memory 335 and a connection between video port 325, keyboard port 327, and mouse port 329 with memory 331. These connections enable decompression device 323 to send data from keyboard port 327 and mouse port 329 to local communication device 126. Local communication device 126 transmits the data over the compression link 127. These connections also enable decompression device 323 to receive data from local communication device 126 and transmit the data to video port 325. One skilled in the art will readily appreciate that there are any number of ways to implement such a configuration utilizing a combination of hardware and/or software.

Figure 4:
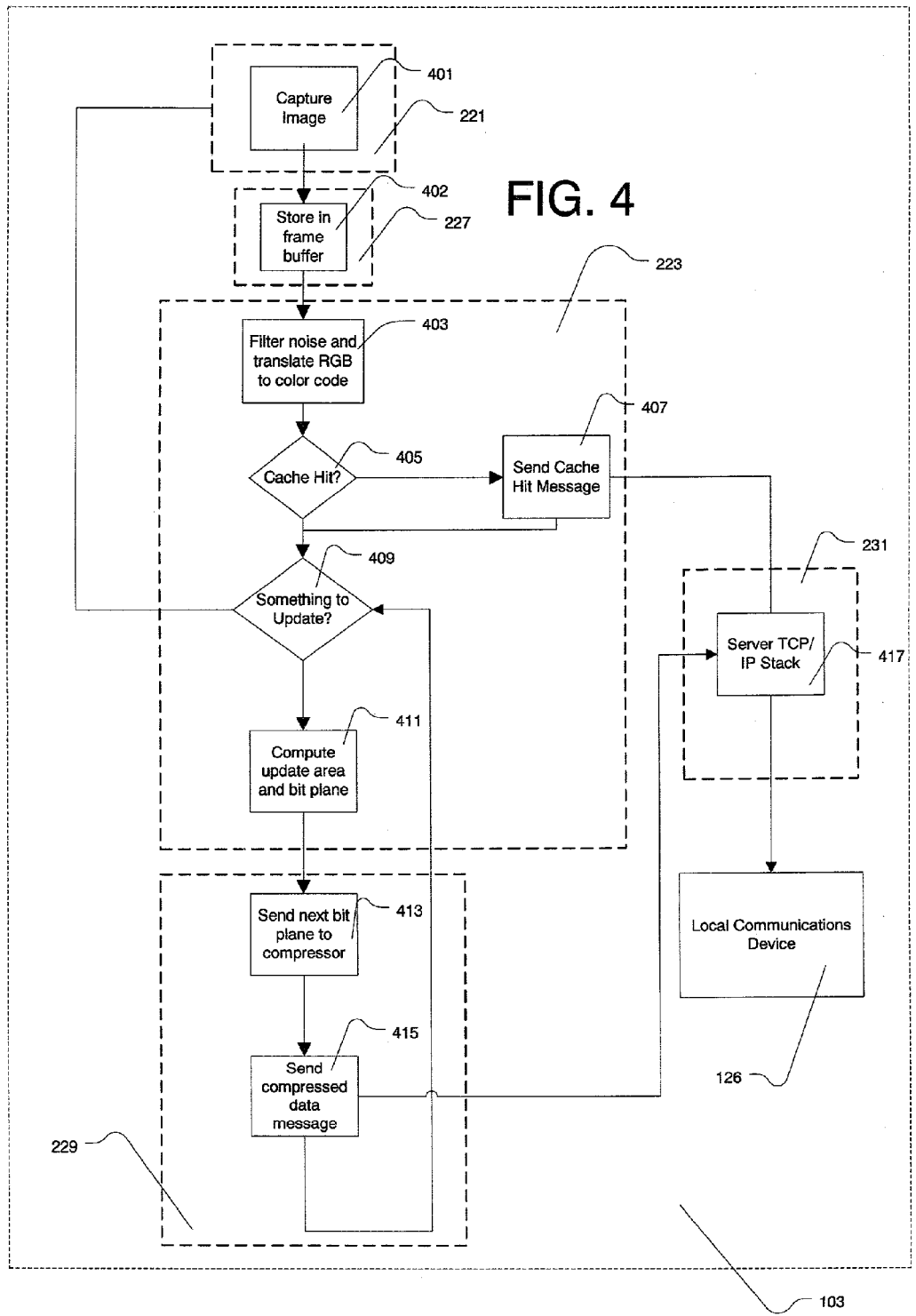
FIG. 4 illustrates a flowchart depicting an overview of the video compression algorithm.

FIG. 4 depicts the function of the compression and digitization apparatus of the present invention. The compression method is implemented by compression device 103, which connects with communication device 125 and standard monitor connection 105 of remote computer 101. The compression process begins at capture image block 401 where data is captured from standard monitor connection 105. Capture image block 401 is implemented in compression device 103, by pixel pusher 221. The video is converted from VGA analog video to a digital representation of the signal. Pixel pusher 221 enables capture image block 402 to grab the raw data and passes it to the frame buffers. Frame store block 402 is a method implemented by device frame buffers 227. Frame store block 402 stores a whole frame of video in frame buffer 227.

The resulting digital representation of the image is divided into a plurality of pixel blocks. The compression process is performed on each pixel block until the entire image has been compressed. The block size may be arbitrarily large, however, in the preferred embodiment the image is divided into blocks which are pixels 64 by 32 pixels.

In filter block 403, each block of pixels is filtered and translated from a RGB representation to a color code representation. The process of filter block 403 is implemented in compression device 103 by microprocessor 223. The filtering is designed to reduce the number of different colors present in each block by converting less frequently occurring colors to more frequently occurring colors. Noise introduced by the A/D converter distorts the pixel values of some pixels. The filtering recognizes pixels that are slightly distorted and adjusts these pixels to the correct value. Such filtering creates an image with greater redundancy, thus yielding higher compression ratios.

The filtering completed in filter block 403 operates on one block of pixels at a time. The size of the block can vary based on bandwidth requirements, the size of the image, etc.

The filtering is implemented as part of the color code conversion process. The color code table is a commonly used compression method of representing colors using fewer bits than if kept in RGB format. By using fewer bits, less information must be transmitted with each frame, allowing video to be transmitted at lower bandwidths. In the present invention, a variety of color code tables may be used depending on the desired number of unique colors in the image, bandwidth restrictions, etc.

The color code table uses the results of the noise filter to convert less frequently occurring pixel colors to more frequently occurring colors. The less frequently occurring pixel values are given the same color code representation as the more frequently occurring pixel values. Thus, the noise reduction and color code conversion is accomplished at the same time.

Compression device 103 keeps a cache of recently transmitted images. Such a cache can be implemented and stored in ram 241. After noise elimination and image conversion, the compression process compares the most recent block with the corresponding block of pixels in recently transmitted images. This check is executed by "cache hit" check 405. The methods of "cache hit" check 405 are implemented in compression device 103 by microprocessor 223. If the most recently transmitted block is the same as the block stored in the cache, there is no need to retransmit the image. Instead, as noted in cache hit message block 407, a "cache hit" message is sent to the local computer, indicating that the most recently transmitted block is already stored in the cache. Cache hit message block 407 is also implemented in compression device 103 by microprocessor 223.

The next step in the process, update check 409, checks to see if the current block of pixels is similar to the corresponding block in the image most recently transmitted. This can also be implemented before "cache hit" check 405, or in parallel with "cache hit" check 405. The main purpose of update check 409 is to check if the block has changed since the last frame. If the block has not changed, there is no need to send an updated block to the local computer. Otherwise, the block is prepared for compression in bit plane block 411. In the preferred embodiment, this update check 409 uses a different technique than the cache check. With two ways of checking for redundancy, higher compression can result. Both the methods of update cache check 409 and the methods of bit plane block 411 are implemented in compression device 103 by microprocessor 223.

For any areas of the image that have changed, the cache is updated, and the data is compressed before being sent to the TCP/IP stack. In the preferred embodiment, the image is compressed using the IBM JBIG compression algorithm. JBIG is designed to compress black and white images. However, the image to be compressed is in color. Therefore, bit planes of the image are extracted in bit plane block 411 and each bit plane is compressed separately by compression block 413. Finally, the compressed image is sent to the local computer. JBIG compression device 229 implements send compressed message block 415. Send compressed message block 415 sends the compressed video to server stack block 417. Server stack block 417, implemented on NIC 231 enables the compressed video to be sent to local communication device 126 using an Internet protocol (in this case TCP/IP).

Figure 5A:
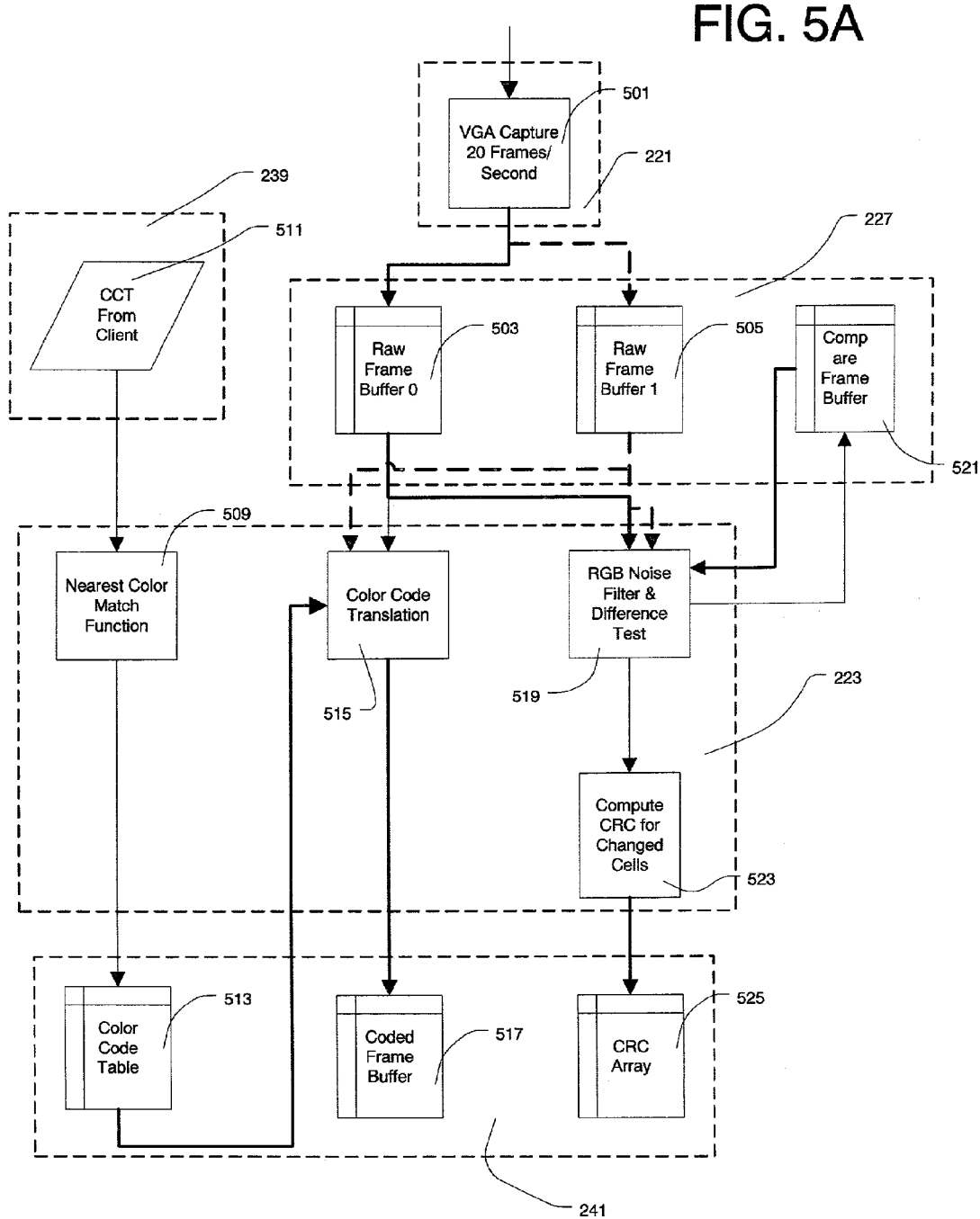
FIG. 5A depicts a more detailed flowchart of the compression algorithm showing and color-code table.
Figure 5B:
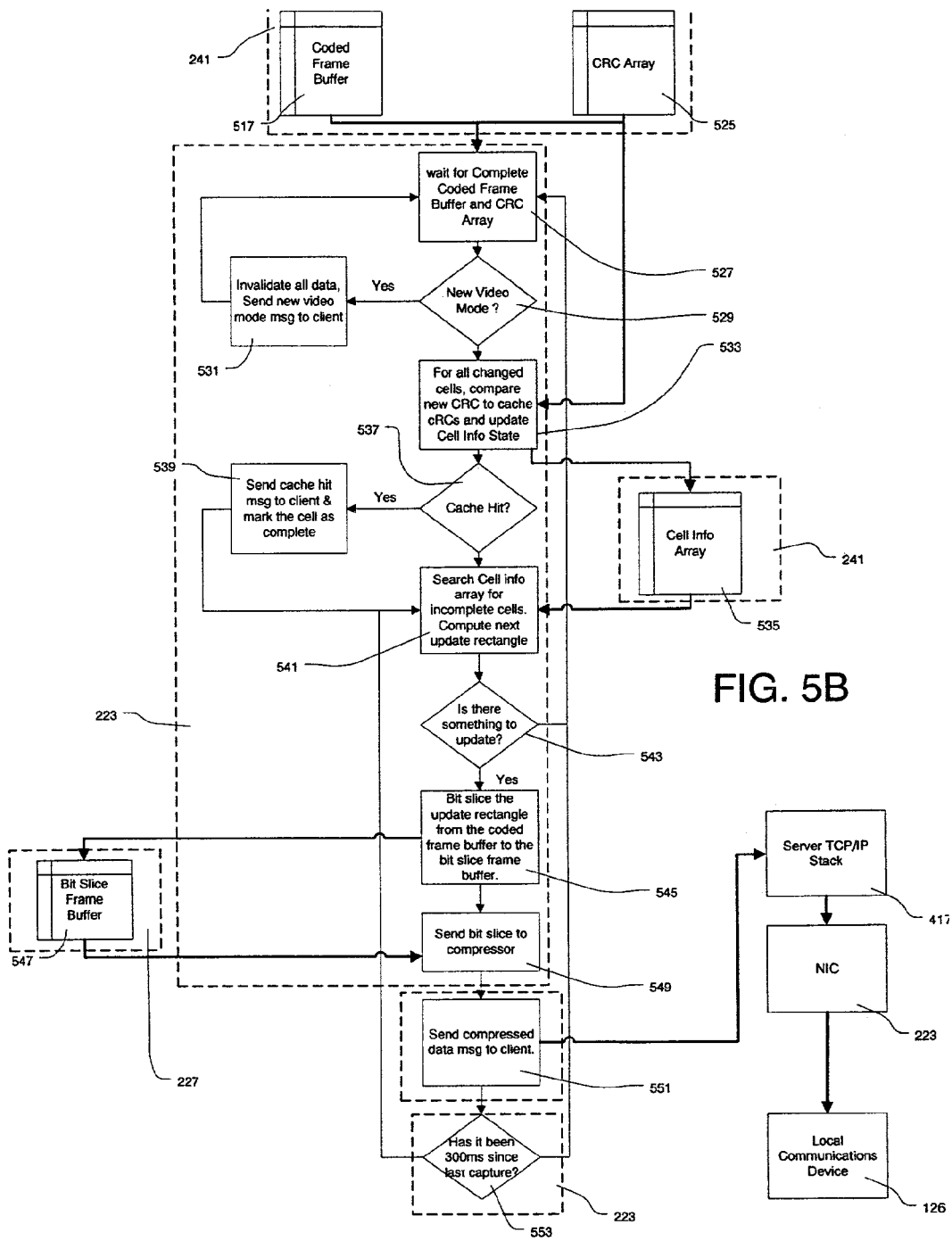
FIG. 5B depicts a detail of a flowchart of the compression algorithm including how the cache testing and JBIG compression fit within the overall algorithm

FIG. 5A and FIG. 5B provide detailed flowcharts of a preferred embodiment of the compression process. As seen in FIG. 5A, the video capture is done at a rate of 20 Frames per second in VGA capture block 501. VGA capture block is implemented by pixel pusher 221 which receives the output of the A/D conversion process. Standard monitors often update at refresh rates as high as 70 times per second. As a rate of 20 frames per second is significantly less frequent, this step limits the amount of data that is captured from the computer. Thus, this first step reduces the bandwidth needed to transmit the video. In this embodiment, the data is outputted in RGB format where 5 bits are allocated to each color. This allows for the representation of 32,768 unique colors. However, other formats capable of storing more or less colors may be used depending on the needs of the users and the total available bandwidth. After receiving the digitized signal, VGA capture block 501 transmits the raw data to frame buffer 0 503 and frame buffer 1 505.

A frame buffer is an area of memory capable of storing one frame of video. Two frame buffers allow faster caching of image data. Raw frames of video are alternatively stored in frame buffer 0 503, and frame buffer 1 505. This allows the next frame of video to be captured even as compression is being performed on the previous frame of video. In compression device 103, frame buffers 227 are a device that are capable of implementing frame buffer 0 503 and frame buffer 1 505.

Figure 6:
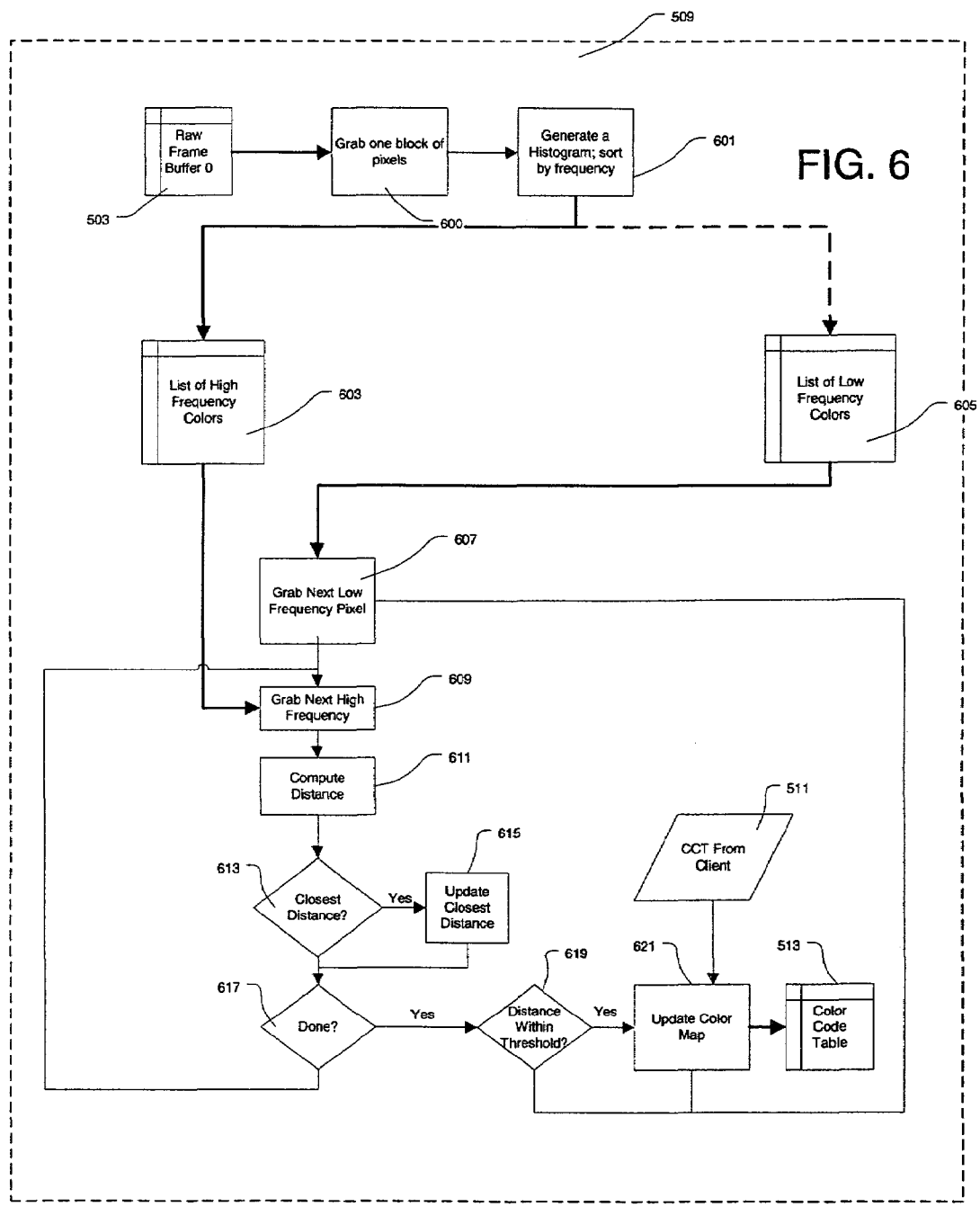
FIG. 6 depicts a flowchart of the nearest match function integrated with the color code table.

The frame buffer that contains the most recent image is used as data for nearest color match function 509 as is the data in color code from client data block 511. Color code from client data block 511 is stored in flash 239. Nearest color match function 509 is a method that can be implemented as a device by microprocessor 223. A detailed explanation of nearest color match function 509 is shown in FIG. 6.

The resulting color code table 513 from nearest color match function 509 is used for color code translation 515. The process translates the RGB representation of each pixel into a more compact form via this color code table translation. Color code table 513 is generated by nearest color match 509 and can be stored in ram 241. Color code translation 515 translates a block of RGB values to their color code values and stores the result in coded frame buffer 517. Coded frame buffer 517 can also be implemented as a device stored in ram 241.

In parallel to the color code translation, a difference test is performed on each block of pixels stored in frame buffer 0 503, and frame buffer 1 505, comparing each block to the corresponding block of the previous frame. The noise filter and difference test, shown as difference test block 519, accomplishes this comparison using the current raw frame buffer, in this example raw frame buffer 0 503, and compare frame buffer 521 stores the pixel values of what is displayed on the user's screen. Difference test block 519 is fully illustrated in FIG. 7.

Once difference test block 519 is complete, the second temporal redundancy check is performed. This process used in performing the second temporal redundancy check begins in CRC compute block 523 by computing the cyclical redundancy check (CRC) for all blocks that have changed.

Cyclic redundancy check (CRC) is a method known in the art for producing a checksum or hash code of a particular block of data. The CRCs can be computed for two blocks of data and then compared. If the CRCs match, the blocks are the same. Thus, CRCs are commonly used to check for errors. Often, a CRC will be appended to a block of transmitted data so that the receiver can verify that the correct data is received. However, in the present invention, the CRC is used to compare a block of data with blocks of data stored in a cache. Thus, in CRC compute block 523, the CRC is computed for each block of data that has changed. The array of CRCs is stored in CRC array buffer 525.

Turning next to FIG. 5B, depicted is an overview of the second temporal redundancy check and the lossless compression of a full frame of video. Wait block 527 waits for the frame buffer and the CRC array to be finished. Next, a decision is made as to whether a new video mode has been declared, as seen in new video check 529. If a new video mode is declared, all data is invalidated in invalidate block 531 and the algorithm starts again. A new frame of video will be received, as seen in FIG. 5A and the second temporal check will return to wait block 527 until a full frame of video is received. Wait block 527, new video mode check 529, and invalidate block 531 are methods that can be implemented as devices by microprocessor 223.

A new video mode can be declared, if for example, a new local computer, with different bandwidth or color requirements connects to the remote computer. A new video mode can also be declared if the bandwidth requirements of the current local computer change.

If in new video check 529 it is deemed that a new video mode has not been declared, then the comparison of the current block's CRC with the cached CRCs is performed in new CRC block 533. This block uses CRC buffer array 525 and cell info array 535. Cell info array 535 stores the cached blocks and the CRCs of the cache blocks and can be implemented as a device in ram 241. New CRC block 533 is a device that can be implemented in microprocessor 223. It also stores the current state of each block to indicate when the block was last updated.

Cache hit check 537, implemented in microprocessor 223 computes whether a current block is located within the cache. If it is, the cell is marked as complete, or updated, in send cache hit block 539. This process of checking and marking as updated is completed for all blocks in the image, and can be implemented in microprocessor 223.

Compute update block 541 checks for incomplete cells, or cells that need to be updated. All cells that need to be updated are combined to for an update rectangle. The update rectangle is compressed and sent to the client. In the decompression stage, the client can use the update rectangle, along with cache hit messages to reconstruct the video to be displayed. If there is nothing to update (if the video has not changed between frames) then update check 543 sends the algorithm back to wait block 527. Thus the current frame will not be sent to the client. By eliminating the retransmission of a current frame of video, the algorithm saves on the necessary bandwidth necessary for transmitting the video.

If however, there are areas of the image that need to be updated, the update rectangle is first compressed. In the preferred embodiment, the method of compression is lossless. One example of a lossless black and white compression is the JBIG compression method disclosed by IBM. However, the compression method of the present invention is designed for color images. Thus, as seen in bit-slice block 545, the image must be divided into bit slices. A bit slice of the image is constructed by taking the same bit from each pixel of an image. Thus, if the image uses 8-bit pixels, it can be deconstructed into 8 bit slices. The resulting bit slices are stored in bit-slice buffer 547. Again, compute update block 541, update check 543, and bit-slice block 545, are all methods that can be implemented as part of compression device 103 by using microprocessor 223.

Each bit slice is sent separately to the compression portion of the algorithm shown as compressor block 549. In this case, JBIG compression is performed on each block and sent to server stack block 417 by compress and transmit block 551. The JBIG compression method of compress and transmit block 549 is implemented in JBIG compression device 229. Since JBIG is designed to operate on bi-level black and white images, the color video output of the monitor is sent to the compressor as separate bit slices. When the video is fully compressed it is sent to the client via NIC 223.

Since the preferred embodiment captures frames 20 times a second, it is necessary to wait 300 ms between frame captures. Thus time check 553 will wait until 300 ms have passed since the previous frame capture before returning the algorithm to wait block 527.

Referring now to FIG. 6, illustrated is the nearest color match function 509 that selectively converts less frequently occurring colors to more frequently occurring colors by mapping the less frequently occurring colors to the color-coded representation of the more frequently occurring colors.

Nearest color match function 509 operates on one block of the images stored in raw frame buffer 0 503 and raw frame buffer 1 505 at a time. As seen in FIG. 6, grab block 600 is used to extract a block of pixels from the image stored in raw frame buffer 0 503 and raw frame buffer 1 505. In this case, raw frame buffer 0 503 is used to extract one block of pixels in grab block 600. In the preferred embodiment of the present invention, the extracted block is 64 by 32 pixels. However, the method can function on blocks of any size.

The goal of nearest color match function 509 is to eliminate noise in a block of pixels introduced by the A/D conversion. This is accomplished by converting less frequently occurring pixel values to similar more frequently occurring pixel values. This is done primarily through histogram analysis and difference calculations.

Nearest color match function 509 generates a histogram of pixel values which are stored in histogram generation block 601. The histogram measures the frequency of each pixel value in the block of pixels extracted by grabbing block 600. The histogram is sorted, such that a list of frequently occurring colors, popular color list 603, and a list of least frequently occurring colors, rare color list 605, are generated. The threshold for each list is adjustable.

The compression analyzes each low frequently occurring pixel to determine if the pixel should be mapped to a value that occurs often. First, grab next rare color block 607 picks a pixel value from rare color list 605 and compares it to a high frequency color pixel extracted by grab next popular color block 609. The distance between the low frequency pixel value and the high frequency pixel value is computed in compute distance block 611. In this process, distance is a metric computed by comparing the separate red, green and blue values of the two pixels. The distance metric, "D," can be computed in a variety of ways. One such example of a distance metric is as follows:

$$D=(R2-R1)^2+(G2-G1)^2+(B2-B1)^2$$

In this formula, R1 is the red value of the low frequency pixel, R2 is the red value of the high frequency pixel, G1 is the green value of the low frequency pixel, G2 is the green value of the high frequency pixel, B1 is the blue value of the low frequency pixel, and B2 is the blue value of the high frequency pixel.

This formula yields a distance metric, D, which is how different the color values are between a low frequently occurring pixel, and a high frequently occurring pixel. The goal of the algorithm is to find the high frequency occurring pixel that yields the lowest D for the current low frequently occurring pixel. Therefore, a compare is done in closest distance check 613, for each D that is computed. Every time a D is computed that is lower than any other previous D, an update is completed by update closest distance block 615.

Once all high frequently occurring pixels are compared as determined by done check 617, a computation in threshold check 619 is performed to see if the lowest occurring D is within a predefined threshold. If this D is within the threshold, color code table 513 is updated by update color map block 621 mapping the low frequently occurring pixel to the color code value of the high frequently occurring pixel that yielded this D value. This process is repeated for all low frequency pixels and color code table 513 is updated accordingly.

Figure 7A:
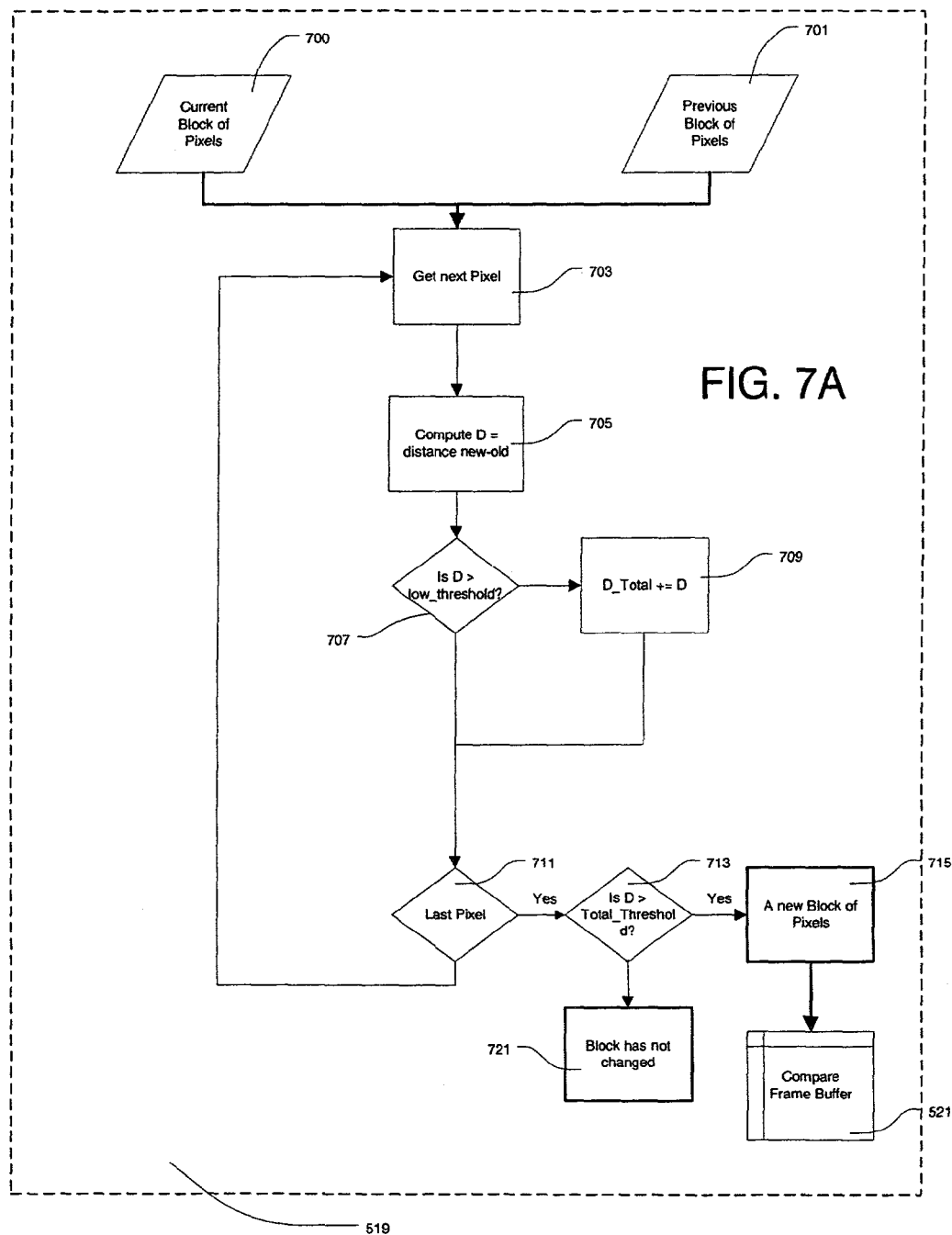
FIG. 7 depicts a flowchart of the Noise Filter & Difference Test.

Next referring to FIG. 7, illustrated is the first temporal redundancy process used in difference test block 519. This process operates on every block in the image. Current pixel block 700 contains one block of pixels from the raw frame buffer. Previous pixel block 701 contains the corresponding block of pixels from compare frame buffer 521. The process begins by extracting corresponding pixel values for one pixel from the current pixel block 700 and previous pixel block 701. The pixels are stored in get next pixel block 703. The pixel values are then compared using a distance metric. In the preferred embodiment, the distance metric is computed in distance metric block 705 using the following formula:

$$D=(R1-R2)^2+(G1-G2)^2+(B1-B2)^2$$

As before, R1, G1, and B1 are the red, green and blue values respectively of the frame buffer pixel. Similarly, R2, G2, and B2 are the red, green and blue values respectively for the compare frame buffer pixel.

Next, the distance metric, D, is compared with a noise tolerance threshold in noise threshold check 707. If D is greater than the noise threshold, it is added to a running sum stored in accumulation block 709. If the two pixels differ by less than this threshold, the difference is considered to be noise, or insignificant, and thus it is not part of the accumulation. This process enables efficient filtering of noise using a block-by-block comparison.

This process of computing distances and summing values greater than a predefined threshold to a running total continues until the last pixel of the block is reached as determined by last pixel check 711. Once the last pixel is reached, the running total is compared with a second threshold, the block threshold, in cell threshold check 713. If the running total is greater than block threshold, the current block from raw frame buffer 0 503 is considered different than the one in compare frame buffer 521. Otherwise, the two are considered close enough to be considered the same.

If the running total exceeds the threshold, a procedure is run as shown in new pixel block 715. A flag is set indicating that the particular block has changed so that it will be transmitted to local computer 111. Further, as seen in FIG. 7, compare frame buffer 521 is updated with the block of pixels to be transmitted.

If the running total does not exceed the threshold, the block is considered to be unchanged from the previous block, and in no pixel change block 721 a flag is set to indicate that this block does not have to be transmitted to the local computer 111. At this point, the second check for temporal redundancy can be performed on the blocks that have changed since the previous transmission.

Figure 7B:
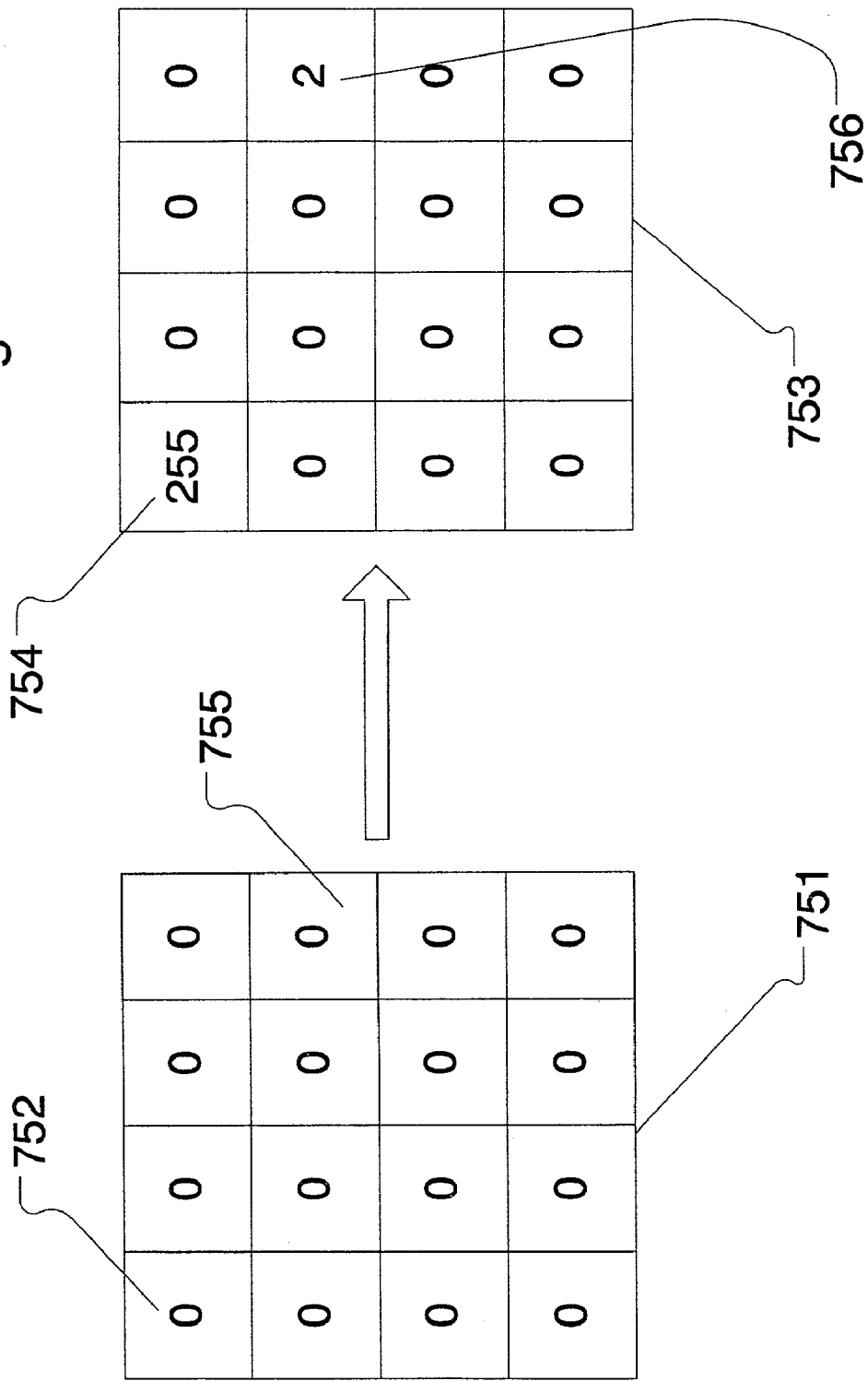

FIG. 7B is used to illustrate the two level thresholding operation on a sample block. For purposes of this disclosure, 8×8 pixel block sizes are used. Each pixel is given a value between 0 and 255 as is common in the art. 0 represents a black pixel. 255 represents a white pixel, and intermediate values represent shades of gray. Second frame compare buffer 751 is a block of pixels from the previously transmitted frame. Since second frame compare buffer 751 has pixels with value 0, second frame compare buffer 751 represents an area that is all black. Previous pixel 752 is the upper leftmost pixel of second frame compare buffer 751.

To simplify, suppose that a small white object, such as a white cursor, enters the area of the screen represented by second frame compare buffer 751. This is represented in first frame buffer 753. In first frame buffer 753 a majority of the pixels are black, however the upper left pixel is white. First frame buffer 753 represents the same spatial area of the video as second frame compare buffer 751, just one frame later. Here current pixel 754 is the same pixel as previous pixel 752 again, just one frame later. In first frame buffer 753 the white cursor is represented by current pixel 754. As a result, current pixel 754 has a pixel value of 255.

Further suppose that noise has been introduced by the A/D converter, such that previous black pixel 755 is now current gray pixel 756. Thus, while previous black pixel 755 has a value of zero, current gray pixel 756 has a value of two.

Further suppose that in this example the "pixel threshold" is 10, and the "cell threshold" is 200. The two-level thresholding algorithm is performed between first frame buffer 753, and second frame compare buffer 751. In computing the running sum of differences, the difference between previous pixel 752, and current pixel 754 is added to the running sum because the difference (255) exceeds the "cell threshold." However, the difference between previous black pixel 755 and current gray pixel 756 is not added to the sum because that difference (2) does not exceed the cell threshold.

The running total will therefore equal 255. Since this total is greater than the cell threshold of 200, the block is considered to have changed. This example illustrates the advantages of the two-level threshold. The noise that entered into current frame 753 was ignored, but at the same time, the real change was recognized.

Figure 8:
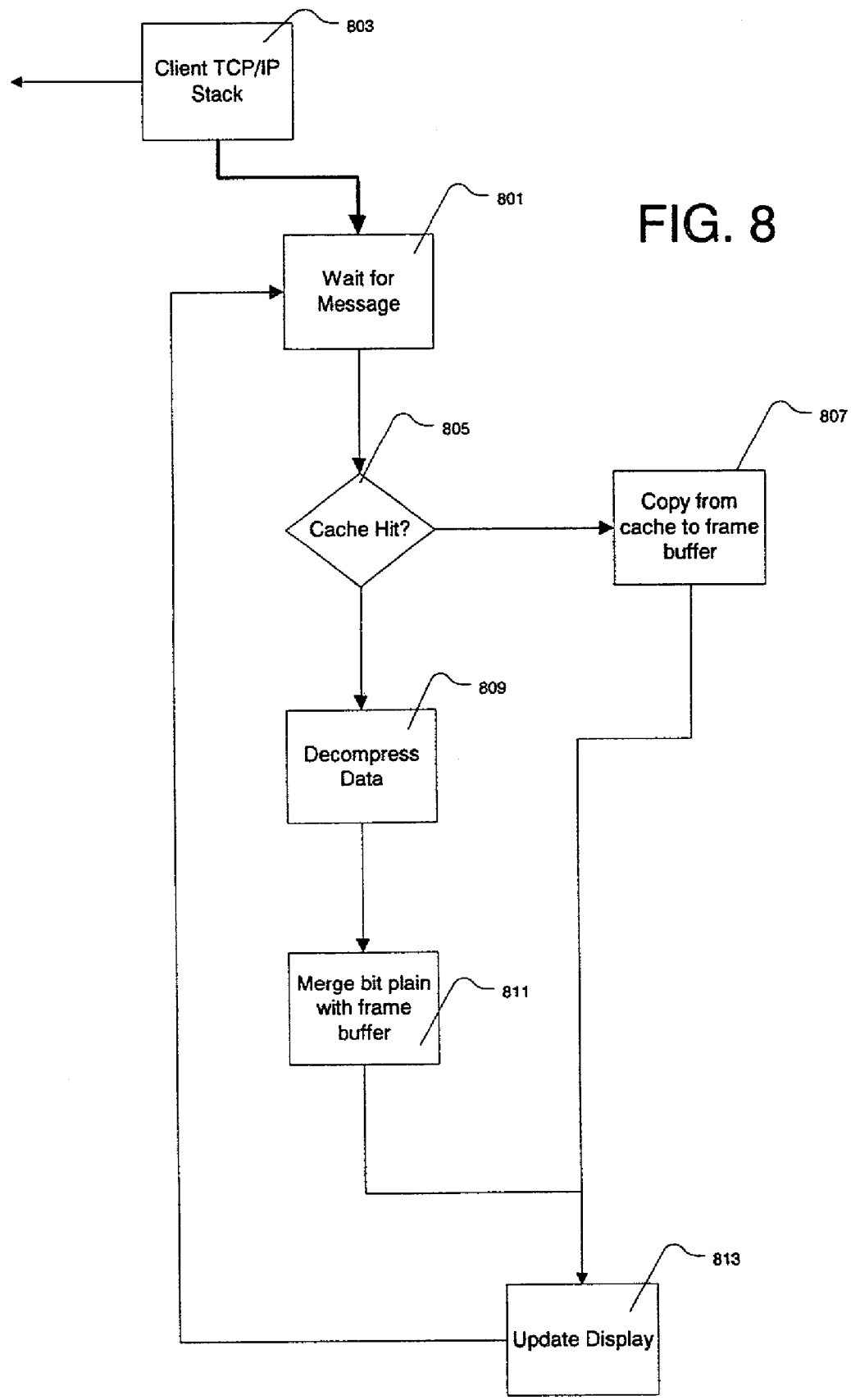
FIG. 8 depicts an overview flowchart of the decompression method including integration with an application on the local computer.

FIG. 8 illustrates the overall decompression method. The process begins by waiting for a message in wait for message block 801. The message is received from local communication device 126 and stored in an area readable by the decompression method. In this embodiment, messages are transmitted using the TCP/IP protocol. When a message is received from the compression device it will be stored locally in TCP/IP stack 803. Wait for message block 801 imports this message from TCP/IP Stack 803. Other embodiments may use a protocol other than TCP/IP, however the functionality of the present invention does not change.

The message received by wait for message block 801 contains either compressed video data or a flag indicating that the updated frame of video is stored in cache. In cache hit decision block 805 analysis of the message is performed to determine if the updated video is stored in the cache. If the updated video is in the cache, the image can be reconstructed from data already stored locally. This reconstruction occurs in cache copy block 807 where data is transferred from the cache to a frame buffer holding data representing the most up-to-date video.

If the transmitted message indicates that the updated video is not in the cache, then decompression of the transmitted video occurs in decompress block 809. As described in the compression figures, the preferred embodiment uses JBIG as the lossless compression technique. Therefore, the decompression of the video frame must occur on one bit plane of data at a time. After each bit plane is decompressed it is merged with the rest of the bit planes stored in the frame buffer. This merging occurs in merge block 811. Once the full frame buffer is constructed the display on the local computer is updated as seen in update display block 813.

In an alternate embodiment, the display on the local computer can be updated after each bit plane is received. A user does not have to wait on receiving the whole frame of video before it displays on the screen. This method is useful if the bandwidth available for video transmission varies. This progressive transmission is one advantage of using JBIG over other compression methods.

Figure 9:
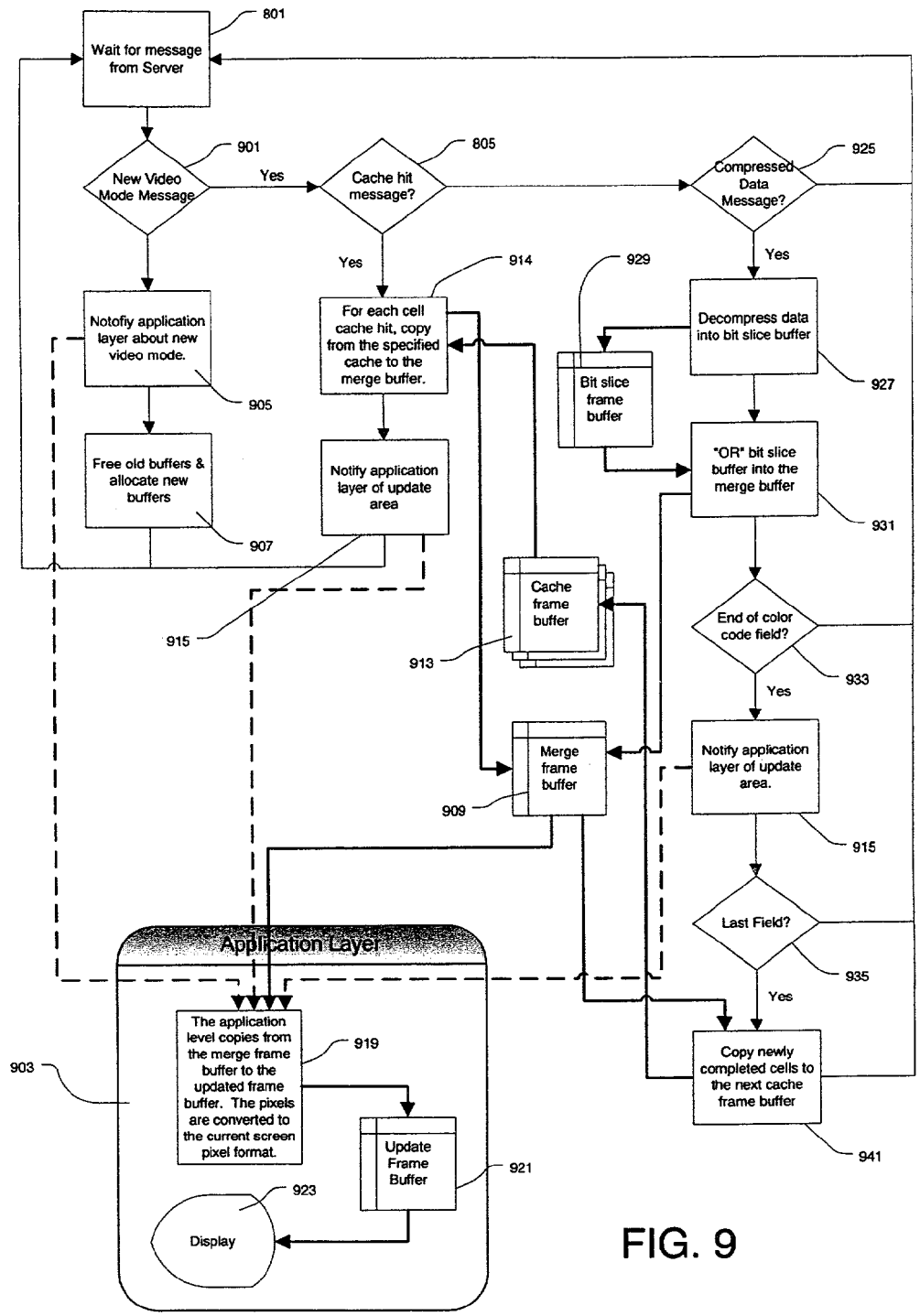
FIG. 9 depicts a more detailed flowchart of the decompression algorithm

FIG. 9 further illustrates the decompression method disclosed in FIG. 8. The method begins with wait for message block 801. It then makes a series of three decisions. The first seen in new video mode message check 901, determines whether the message is a new video mode message. A new video mode message can be sent for a variety of reasons, including a bandwidth change, a change in screen resolution, or color depth, or a new client. This list is not meant to limit the reasons for sending a new video mode message, but instead to give examples of why it may occur. If a new video mode message has been transmitted, the decompression device notifies application 903. Application 903 is the program running on the local computer that executes the operations of the decompression device. Application 903 interfaces with the input/output of local computer 111. Any updates in data must therefore be sent to application 903. Once application 903 is notified, the decompression device enters free buffer block 907. Free buffer block 907 frees all buffers including any memory devoted to storing previously transmitted frames. The decompression method then restarts to wait for message block 801, waiting for a message from compression device 103.

If a new video mode message was not sent, the message is checked to see if it indicates the current frame of video is stored in cache. This check is seen in cache hit decision block 805. If the decompression method determines that the message does indicate a cache hit, it will update merge frame buffer 909 with data from cache frame buffer 913, as seen in notify application layer block 915. Merge frame buffer 909 contains the most up-to-date data indicating what should be displayed on the local monitor. Cache frame buffer 913, stores the same recently transmitted frames in cache that are stored on the compression device. Thus, if a "cache hit" message is received by the decompression device, the video data needed to complete the update of merge frame buffer 909, with data from cache frame buffer 913. Copy block 914 receives cache frame buffer 913 data as input and outputs this data to merge frame buffer 909.

After the updating of merge frame buffer 909, notify application layer block 915 notifies application 903 of new data. In application copy block 919 application 903 receives data from merge frame buffer 909 and translates the data into a pixel format that can be displayed on the screen. Application copy block 919 completes this translation and sends the data in current screen pixel format to an update frame buffer 921 which is an area of memory that can be read by display 923. Display 923 may include a video card, memory, and any additional hardware and software commonly used for video monitors.

If the message sent from the compression device does not contain a cache hit as determined by cache hit decision block 805, then the decompression method confirms that the message contains compressed data in compressed data message decision block 925. If there is no compressed data the algorithm restarts at wait for message block 801. Otherwise, the data is decompressed into bit slice buffers in decompress data block 927. If the JBIG compression algorithm is used, the data has been divided into bit slices when compressed. Therefore, the first step in the decompression of said data is to divide it into those bit slices and decompress each bit slice. As each bit slice is decompressed, it is stored in bit slice frame buffer 929 and then combined with the previous bit slices via an "OR" type operation completed in "OR" block 931.

Next, end of field decision block 933 calculates whether all of the data from one field of the current frame has been received. If a full field has been received, then the decompression method notifies application 903 in notify application layer block 915. Again, like with a cache hit, the notification allows the application to read from merge frame buffer 909. The data from merge frame buffer 909 is converted into current screen pixel format in application copy block 919 and transmitted to the update frame buffer 921. The data in update frame buffer 921 is used in display 923. If end of field decision block 933 determines that the full field has not arrived, the method returns to wait for message block 801 to wait for the rest of the message.

Once the full field of video has been sent to the application level, a second check in decision block 935 is performed to see if the field is the last field included in the message. If it is, the cache is updated by update cache block 941. Otherwise, the method continues to wait on more data from the compression device in wait for message block 801. In update cache block 937 new data overwrites older data in the cache. This keeps the cache up-to-date and synchronized with the compression device cache.

After the completion of the cache update, the system returns to the wait for message from server block 801. This process continues so long as the compression device sends frames of video.

Figure 10:
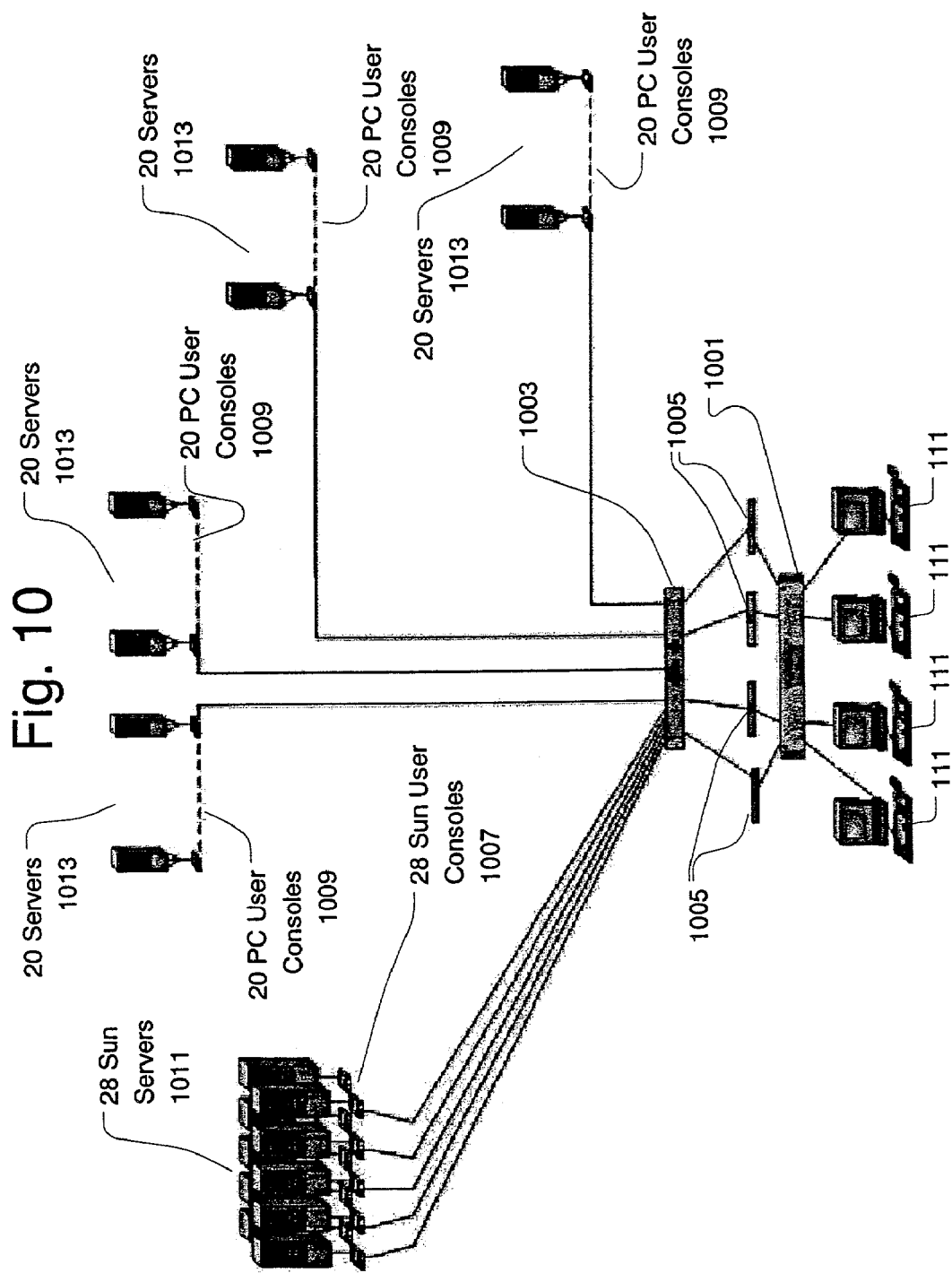
FIG. 10 illustrates an example of an alternate configuration of the present invention in which multiple inputs of four local computers in conjunction with KVM switches are utilized to control remote servers.

Next turn to FIG. 10, illustrated is an alternative embodiment in which the outputs of 4-input 4-output compression switch 1001 are connected to 42 port Paragon KVM switch 1003 via four compression user stations 1005. 4-input 4-output compression switch 1001 utilizes the compression methods of the present invention within a 4-input 4-output KVM switch. 42-port Paragon KVM switch 1003 is a KVM switch with 4 inputs and 42 outputs. In this configuration there can be up to four local computers 111. Each compression user station 1005 receives one output of 4-input 4-output compression switch 1001, and sends the output to the input of 42-port Paragon KVM Switch 1003. Twenty eight outputs from 42-port Paragon KVM Switch 1003 are connected to 28 Sun User Consoles 1007. The remaining outputs of 42-port Paragon KVM Switch 1003 are connected to 20 PC User Consoles 1009. Each Sun User Consol 1007 is connected to a remote sun workstation 1011, while each PC User Console 1009 is connected to a remote PC Server 1013. Thus in this configuration, a compression device, in this case, 4-input 4-output compression switch 1001, can control 108 total servers of which 28 are remote sun workstations 1011, and the other 80 are remote PC Servers 1013.

Figure 11:
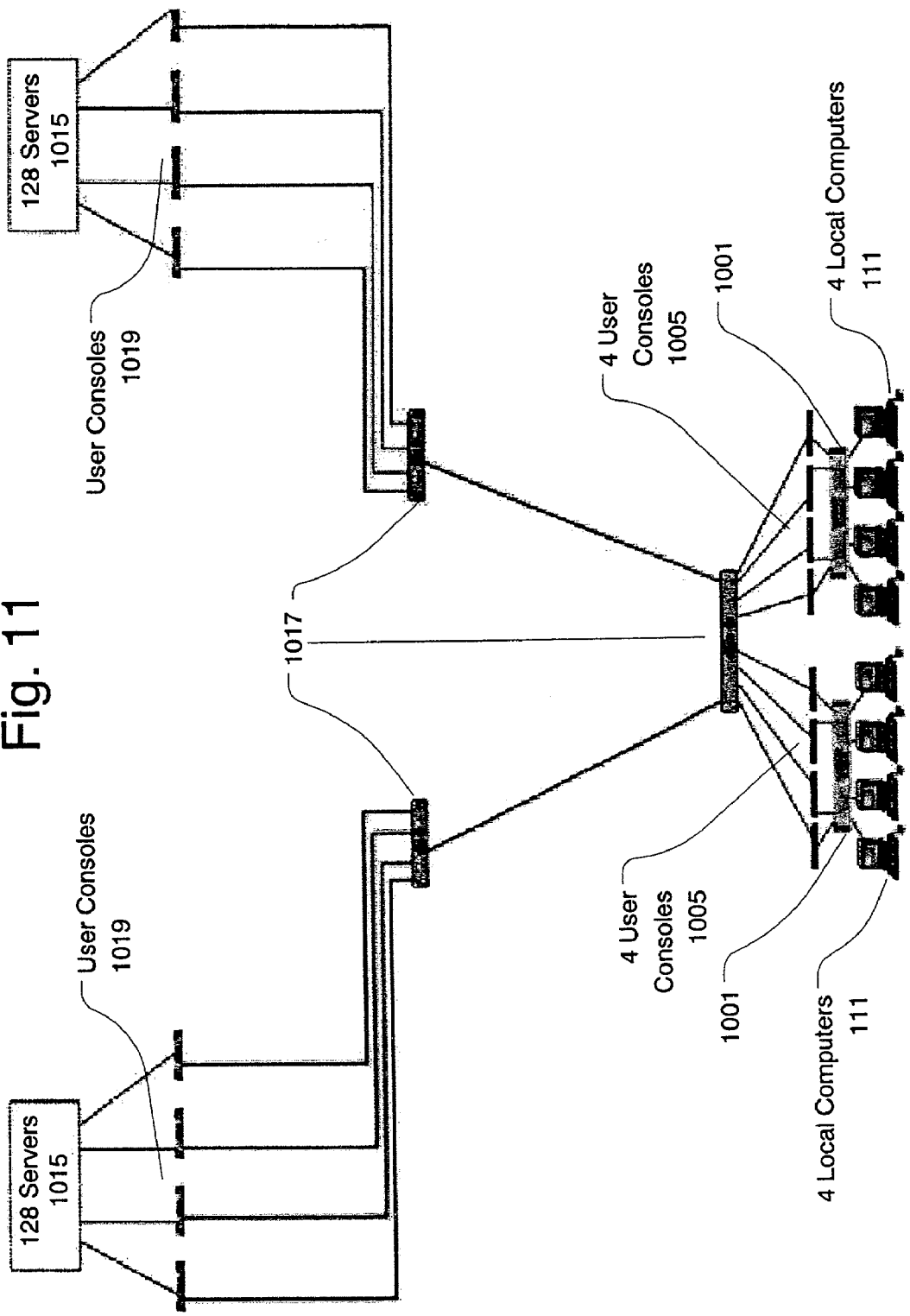
FIG. 11 illustrates an alternate configuration of the present invention in which 8 local computers control 256 servers.

FIG. 11 illustrates an alternate configuration of the present invention in which 8 local computers control 256 servers. In this embodiment, three 32-channel KVM switches 1017 are used in a two-level configuration. The first level 32-channel KVM switch 1017 is used as the input to the other two 32-channel KVM switches 1017. As in other arrangements, each remote server 1015 has a user console 1019 that accepts input from 32-channel KVM switch 1017 and converts the input into a readable form for each remote server 1015. As in alternate embodiments, the output from each 4-input, 4-output compression switch 1001 is sent to compression user stations 1005 to convert this output into a form readable by 32-channel KVM switch 1017.

Figure 12:
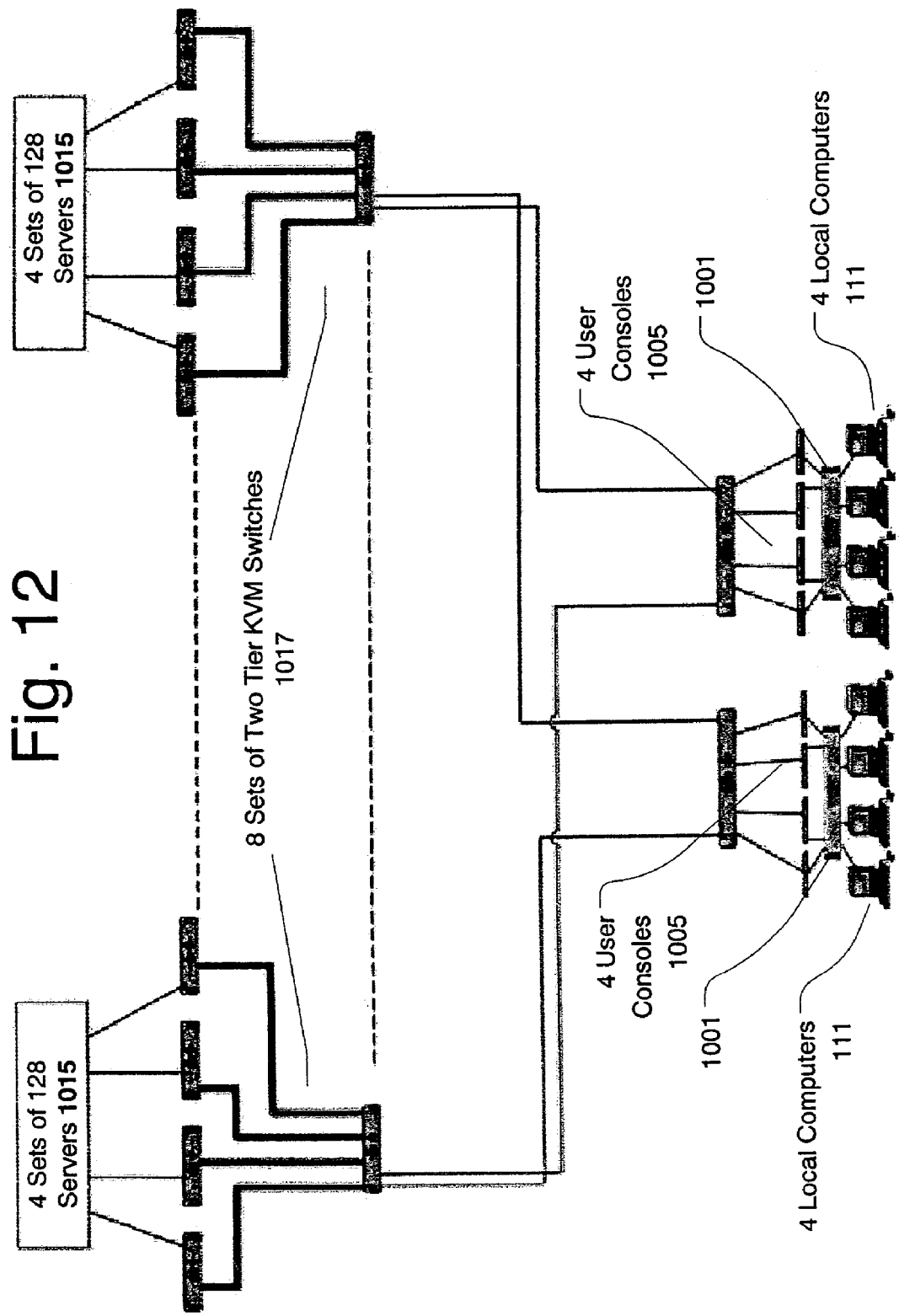
FIG. 12 illustrates an alternate configuration wherein 8 local computers control 1024 remote servers.

FIG. 12 illustrates an alternate configuration wherein 8 local computers control 1024 remote servers. In this configuration there are two 4-input 4-output compression switches 1001 used in conjunction with three levels of 32-channel KVM switches 1017. In sum, there are 42 32-channel KVM switches 1017. As with other configurations, each remote server 1015 has a user console 1019 capable of accepting input from 32-channel KVM switch 1017, and outputs to remote server 1015. Further, the output from each 4-input 4-output switch 1001 is sent to compression user stations 1005.

Figure 13:
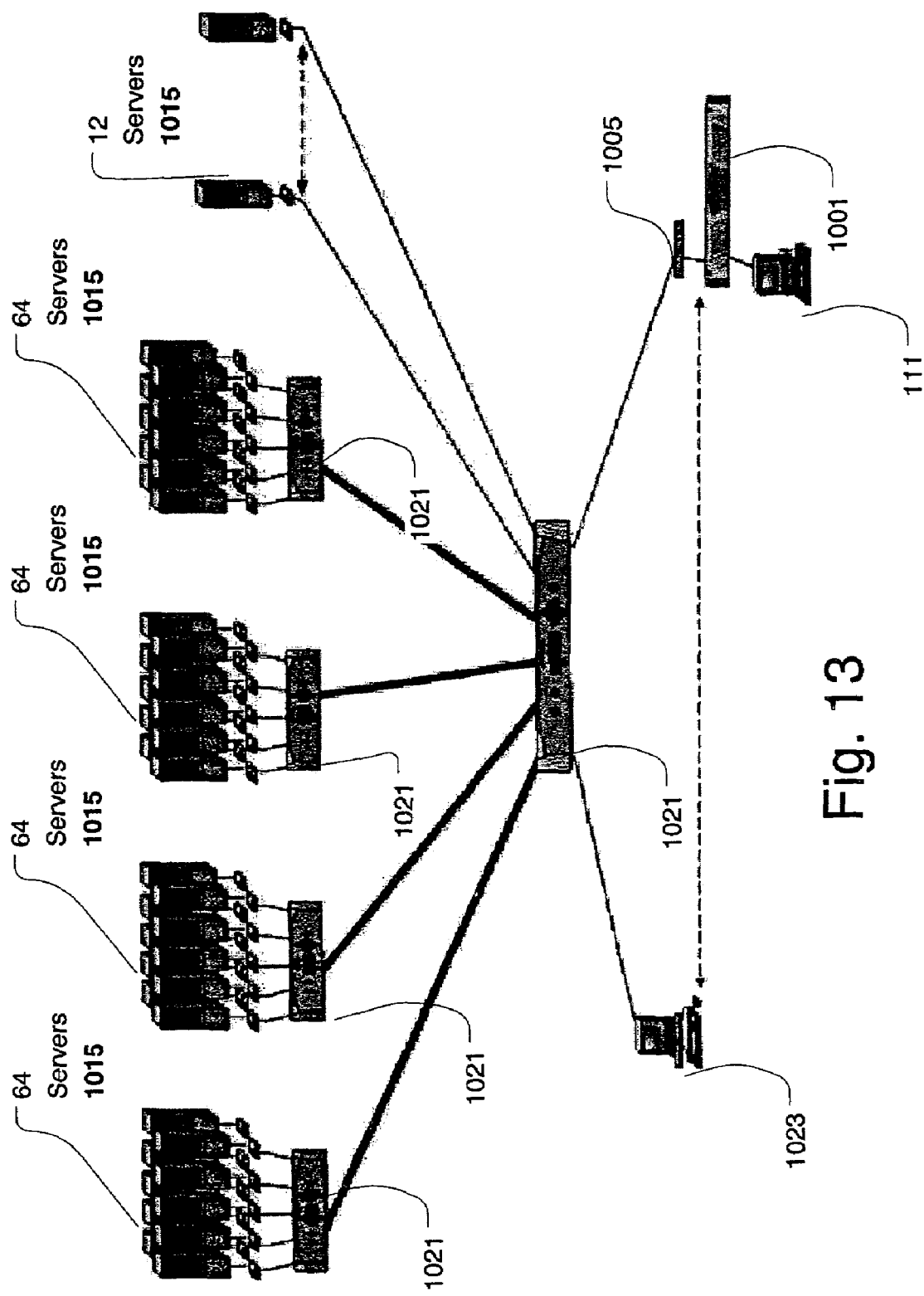
FIG. 13 illustrates an example of an alternate embodiment of the present invention wherein 16 local computers control 256 remote servers.

FIG. 13 illustrates an example of an alternate embodiment of the present invention wherein 16 local computers control of the 256 remote servers. This configuration shows how, with a combination of the present invention and KVM switches, remote computers can be controlled locally, or at the remote location itself. In FIG. 13, there is a 16-input 16-output KVM switch 1021, with inputs connected to a combination of local computers 111, and remote controlling computer 1023. As in other configurations, the local computers 111 connect to the remote servers 1015, via 4-input 4-output compression switch 1001, and compression user station 1005. The outputs of the 16-input 16-output KVM switch are sent to a combination of remote servers 1015, and remote servers 1015 connected to additional 16-input 16-output KVM switches 1021. In total, there are 268 remote servers 1015 that can be controlled by the local computers 111, and the remote controlling computer 1023.

While the present invention has been described with reference to one or more preferred embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

I claim:

1. A method for transmitting video signals over a network from a remote one of a plurality of remote computers to one of a plurality of user workstations, said method comprising the steps of:

receiving a video signal from a remote computer;

dividing said video signal into one or more blocks of pixels;

generating a histogram of pixel values for each of said blocks;

generating frequently occurring pixel values and infrequently occurring pixel values using said histogram;

determining if the infrequently occurring pixel values should be mapped to the frequently occurring pixel values;

converting said video signal to a compressed video signal by mapping said infrequently occurring pixel values to said frequently occurring pixel values based on said determining step, and;

transmitting said compressed video signal to a user workstation, wherein said step of determining includes the steps of calculating a distance function between a infrequently occurring pixel value and a frequently occurring pixel value;

comparing the computed distance function to a previously stored computed distance function;

replacing the previously stored computer distance function with the computed distance function if it is eater than the computed distance function;

repeating the steps of calculating, comparing and replacing distance functions for all frequently occurring pixel values against the infrequently occurring pixel value;

updating the color map if the stored distance function is less than a threshold distance;

repeating the step of repeating the steps of calculating, comparing and replacing distance functions for all frequently occurring pixel values against the infrequently occurring pixel value and updating the color map for all the infrequently occurring pixel values.

2. A method according to claim 1, wherein said video signal is digitized upon said receiving.

3. A method according to claim 1, said method further comprising a step of:

converting each pixel that comprises said video signal to a compact representation.

4. A method according to claim 3, wherein said compact representation is an 8-bit per pixel representation.

5. A method according to claim 1, wherein said converting includes mapping each said pixel according to a color code table.

6. A method according to claim 1, wherein said transmitting includes:

bit-splicing said video signal to form bit-frames;

compressing said bit-frames to form compressed bit-frames; and sequentially transmitting said compressed bit-frames to said user workstation.

7. A method according to claim 6, wherein said compressing is preformed utilizing a lossless compression algorithm.

8. A method according to claim 1, said method further comprising the step of:

comparing one of said pixel blocks to a cache of stored pixel blocks.

9. A method according to claim 8, said method further comprising the step of:

updating said cache with one of said pixel blocks in response to said comparing.

10. A method according to claim 8, wherein said comparing includes computing a cyclic redundancy check (CRC) code for at least one of said pixel blocks.

11. A method according to claim 8, wherein said comparing includes computing at least one hash code for at least one of said pixel blocks.

12. A method according to claim 8, wherein said pixel blocks are only transmitted to said user workstation if said pixel blocks are not in said cache.

13. A method according to claim 1, wherein said remote computer and said user workstation are connected via a network.

14. A method according to claim 13, wherein said network is selected from the group consisting of a local area network (LAN), a wide area network (WAN), the Internet, a wireless network, or a modem connection.

15. A method according to claim 13, wherein said network further comprises a KVM switch.

* * * * *

UNITED STATES PATENT AND TRADEMARK OFFICE
CERTIFICATE OF CORRECTION

| | | |
|---|---|---|
| PATENT NO. | : 7,684,483 B2 | Page 1 of 1 |
| APPLICATION NO. | : 10/233299 | |
| DATED | : March 23, 2010 | |
| INVENTOR(S) | : Scott Coleman | |

It is certified that error appears in the above-identified patent and that said Letters Patent is hereby corrected as shown below:

In the Claims:

Col. 26, line 53, the word "eater" should be replaced with --greater--.

Signed and Sealed this
Eighteenth Day of June, 2013

Teresa Stanek Rea
*Acting Director of the United States Patent and Trademark Office*